(12) United States Patent
Kurishige et al.

(10) Patent No.: US 6,450,287 B1
(45) Date of Patent: Sep. 17, 2002

(54) ELECTRIC POWER STEERING CONTROLLER AND CONTROL METHOD THEREOF

(75) Inventors: Masahiko Kurishige; Noriyuki Inoue; Ryoji Nishiyama; Takayuki Kifuku; Shunichi Wada, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/604,289

(22) Filed: Jun. 26, 2000

(30) Foreign Application Priority Data

Aug. 19, 1999 (JP) .............................. 11-233285
Jan. 25, 2000 (JP) ....................... 2000-016026

(51) Int. Cl.⁷ ................................ B62D 5/06
(52) U.S. Cl. ......................... 180/446; 180/443; 701/41
(58) Field of Search ............................... 180/443, 446, 180/402, 412, 413, 404, 421; 701/41, 42; 318/432

(56) References Cited

U.S. PATENT DOCUMENTS

| | | | | |
|---|---|---|---|---|
| 4,664,211 A | * | 5/1987 | Oshita et al. | 180/446 |
| 4,681,183 A | * | 7/1987 | Oshita | 180/446 |
| 4,753,308 A | * | 6/1988 | Noto et al. | 180/446 |
| 4,800,975 A | * | 1/1989 | Oshita et al. | 180/446 |
| 4,837,692 A | * | 6/1989 | Shimizu | 364/424.05 |
| 4,875,541 A | * | 10/1989 | Oshita et al. | 180/446 |
| 4,979,114 A | * | 12/1990 | Oshita et al. | 364/424.05 |
| 5,097,918 A | * | 3/1992 | Daido et al. | 180/446 |
| 5,201,818 A | * | 4/1993 | Nishimoto | 180/446 |
| 5,253,725 A | * | 10/1993 | Nishimoto | 180/446 |
| 5,398,953 A | | 3/1995 | Shimizu | |
| 5,528,497 A | | 6/1996 | Yamamoto et al. | |
| 5,596,252 A | * | 1/1997 | Shimizu et al. | 318/432 |
| 5,703,775 A | | 12/1997 | Yamamoto et al. | |
| 5,719,766 A | * | 2/1998 | Bolourchi et al. | 364/424.052 |
| 5,740,040 A | | 4/1998 | Kifuku et al. | 364/424.051 |
| 5,828,972 A | | 10/1998 | Asanuma et al. | |
| 5,828,973 A | * | 10/1998 | Takeuchi et al. | 701/41 |
| 5,861,725 A | | 1/1999 | Endo et al. | |
| 5,881,836 A | * | 3/1999 | Nishimoto et al. | 180/446 |
| 6,131,693 A | * | 10/2000 | Mukai et al. | 180/446 |
| 6,161,068 A | * | 12/2000 | Kurishige et al. | 701/41 |

FOREIGN PATENT DOCUMENTS

| | | |
|---|---|---|
| JP | 62-39369 | 2/1987 |
| JP | 2-67239 | 5/1990 |
| JP | 5-105100 | 4/1993 |
| JP | 5-213222 | 8/1993 |
| JP | 6-56046 | 3/1994 |
| JP | 6-87458 | 3/1994 |
| JP | 6-087458 | 3/1994 |
| JP | 6-144280 | 5/1994 |

(List continued on next page.)

OTHER PUBLICATIONS

"Electrically–Operated Power Steering Engineering", Mitsubishi Technical Journal, vol. 70, No. 9, 1996, pp. 43–48.

*Primary Examiner*—Kevin Hurley
*Assistant Examiner*—Daniel Yeagley
(74) *Attorney, Agent, or Firm*—Leydig, Voit & Mayer, Ltd.

(57) ABSTRACT

An electric power steering controller including a motor for generating torque for assisting the steering torque of a driver to assist the steering force of a steering system. The controller includes a road reaction torque detector for detecting road reaction torque received by tires from the surface of a road, and a road detection torque addition control for controlling the torque of the motor based on the road reaction torque. The electric power steering controller enables the steering wheel to be returned to its starting point without adding torque in a direction in which the driver returns the steering wheel when the driver contgrols the steering wheel with the small road reaction torque of the tires, for example, when turning at an intersection at a low speed or when turning at a gently curved portion of a road at a high speed.

18 Claims, 32 Drawing Sheets

FOREIGN PATENT DOCUMENTS

| | | |
|---|---|---|
| JP | 9-156518 | 6/1997 |
| JP | 10-59203 | 3/1998 |
| JP | 10-258748 | 9/1998 |
| JP | 11-47197 | 2/1999 |
| JP | 11-48938 | 2/1999 |
| JP | 11-59456 | 3/1999 |

* cited by examiner

STEERING TORQUE SIGNAL USED BY ROAD
REACTION DETECTOR FOR COMPUTATION

STEERING TORQUE SIGNAL USED BY ROAD
REACTION DETECTOR FOR COMPUTATION

ELECTRIC POWER STEERING CONTROLLER AND CONTROL METHOD THEREOF

BACKGROUND OF THE INVENTION

1. Field of the Invention

The present invention relates to an electric power steering controller for automobiles which causes a motor to generate torque for assisting the steering torque of a driver to assist the steering force of a steering system.

2. Description of the Prior Art

FIG. 40 is a block diagram showing the constitution of an electric power steering controller of the prior art disclosed by Japanese Laid-open Patent Application No. 7-186994, for example. In the figure, reference numeral 1 denotes a steering torque detector for detecting steering torque when a driver controls the steering wheel, 2 a steering torque controller for computing an assist torque signal based on the output of the steering torque detector 1, 3 a damping compensator for computing a damping compensation signal based on the output of a motor speed detector 5, and 4 an inertia compensator for computing an inertia compensation signal based on the output of a motor acceleration detector 6. Denoted by 7 is a motor current decision unit for computing a target current signal from target torque which is the sum of an assist torque signal, damping compensation signal and inertia compensation signal, computed by a first adder 12, 8 a decision unit for judging whether the output of the steering torque detector 1 and the output of the motor speed detector 5 have the same direction and outputting its decision result to the steering torque controller 2, the damping compensator 3 and the inertia compensator 4, 9 a motor drive unit for determining voltage to be applied to a motor 10 based on a difference obtained by a second adder 13 between a target current signal and a motor current value detected by the motor current detector 11 and applying the above voltage to the motor 10, and 10 the motor for generating assist torque which is substantially proportional to a motor current value which changes according to the above applied voltage to drive a steering unit. Reference numeral 14 denotes a car speed detector for detecting car speed and outputting its detected car speed signal to the steering torque controller 2, damping compensator 3 and inertia compensator 4.

A description is subsequently given of the operation of the electric power steering controller of the prior art.

When the car driver controls the steering wheel, steering torque at this point is measured by the steering torque detector 1 and output to the steering torque controller 2. The steering torque controller 2 computes an assist torque signal which is substantially proportional to the output signal of the above steering torque detector 1 and based on which the motor 10 is driven to assist the steering torque of the driver so as to reduce it.

At this point, the decision unit 8 judges whether the output of the steering torque detector 1 and the output of the motor speed detector 5 are the same. When they are the same, the damping compensator 3 and the inertia compensator 4 are not activated, the steering torque controller 2 determines target torque based on the assist torque signal which is determined based on the output of the steering torque detector 1 and a car speed signal from the car speed detector 14, and the motor current decision unit 7 determines a motor drive current. When they are not the same, the steering torque controller 2 is not activated, target torque is determined based on the outputs of the damping compensator 3 and the inertia compensator 4, and the motor current decision unit 7 determines a motor drive current. When the car speed is low at this point, the direction of target torque is made the same as the revolution direction of the motor and when the car speed is high, the direction of target torque is made opposite to the revolution direction of the motor. Therefore, when the driver turns the steering wheel, the steering torque of the driver is assisted to lighten torque required for steering. When the driver returns the steering wheel, the motor 10 is controlled such that the steering wheel is assisted to return to its starting point when the car speed is low and prevented from returning to its starting point at an excessive rotation speed when the car speed is high.

Generally speaking, the driver controls the steering wheel when turning a curved portion of a road or an intersection and returns the steering wheel to its starting point, making use of the spontaneous return force of the steering wheel generated by the road reaction torque of tires when returning to straight-line driving. However, since the road reaction torque of the tires is small when the driver controls the steering wheel slightly at a low car speed or a high car speed, the road reaction torque becomes smaller than friction torque in the steering unit, whereby the steering wheel does not return to its starting point in many cases at the time of returning to straight-line driving. Therefore, in this case, the driver must add torque to the steering wheel to return it to its starting point, thereby deteriorating a steering feeling.

In contrast to this, in the prior art, it is judged whether the output of the steering torque detector 1 and the output of the motor acceleration detector 6 are the same or not when the car speed is low, and a motor drive current is determined such that the motor 10 revolves in the same direction as the revolution direction of the motor when they are different, thereby improving the returnability of the steering wheel at a low car speed.

However, in the above prior art, when the driver controls the steering wheel with the small road reaction torque of the tires, for example, when the driver turns an intersection at a low speed or a gently curved portion of a road at a high speed, the steering wheel is stopped unless torque is added in a direction for returning the steering wheel, whereby the motor 10 does not revolve. Since the decision unit 8 cannot judge whether the output of the steering torque detector 1 and the output of the motor speed detector 5 are the same or not, it cannot determine a motor drive current for revolving the motor 10 in the same direction as the revolution direction of the motor and cannot improve the returnability of the steering wheel.

Further, since a motor drive current can be determined only to revolve the motor in a direction opposite to the revolution direction of the motor at the time of high-speed driving in the above prior art, the returnability of the steering wheel cannot be improved.

SUMMARY OF THE INVENTION

It is an object of the present invention which has been made to solve the above problems to provide an electric power steering controller which enables the steering wheel to be returned to its starting point without adding torque in a direction in which the driver returns the steering wheel when he/she controls the steering wheel with the small road reaction torque of the tires, for example, when he/she turns an intersection at a low speed or when he/she turns a gently curved portion of a road at a high speed.

According to a first aspect of the present invention, there is provided an electric power steering controller which comprises road reaction torque detection means for detecting road reaction torque received by tires from a road and road reaction torque addition control means for controlling the torque of a motor for assisting the steering torque of a driver based on road reaction torque detected by the road reaction torque detection means.

According to a second aspect of the present invention, there is provided an electric power steering controller which further comprises steering torque detection means for detecting the steering torque of the driver and steering assist control means for controlling the torque of the motor based on the output of the steering torque detection means.

According to a third aspect of the present invention, there is provided an electric power steering controller wherein the amount of control of the above road reaction torque addition control means is a value obtained by multiplying the output of the road reaction torque detection means by a single gain or multiple gains and the maximum value of control is limited by a limiter.

According to a fourth aspect of the present invention, there is provided an electric power steering controller wherein car speed detection means for detecting car speed is provided and the values of the above gain and limiter are set according to the output of this car speed detection means.

According to a fifth aspect of the present invention, there is provided an electric power steering controller wherein the values of the above gain and limiter are set such that the output of the road reaction torque addition control means becomes large when the car speed is low excluding the case where the car speed is extremely low at the time of parking.

According to a sixth aspect of the present invention, there is provided an electric power steering controller wherein motor current detection means for detecting a current running through the motor and motor rotation angle acceleration detection means for detecting the rotation angle acceleration of the motor are provided, and the road reaction torque detection means obtains a road reaction torque detection value by passing through a low-pass filter a value obtained by subtracting motor inertia torque in terms of a steering shaft computed from the output of the above rotation angle acceleration detection means from the sum of the output of the steering torque detection means and motor torque in terms of the steering shaft computed from the output of the above motor current detection means.

According to a seventh aspect of the present invention, there is provided an electric power steering controller wherein motor current detection means for detecting a current running through the motor is provided, and the road reaction torque detection means obtains a road reaction torque detection value by passing through a low-pass filter a value obtained by adding up the output of the steering torque detection means and motor torque in terms of the steering shaft computed from the output of the above motor current detection means.

According to an eighth aspect of the present invention, there is provided an electric power steering controller wherein motor rotation angle acceleration detection means for detecting the rotation angle acceleration of the motor is provided, and the road reaction toque detection means obtains a road reaction torque detection value by passing through a low-pass filter a value obtained by subtracting motor inertia torque in terms of the steering shaft computed from the output of the above motor rotation angle acceleration detection means from the output of the steering torque detection means.

According to a ninth aspect of the present invention, there is provided an electric power steering controller wherein motor torque detection means for detecting torque generated by the motor and motor rotation angle acceleration detection means for detecting the rotation angle acceleration of the motor are provided, and the road reaction torque detection means obtains a road reaction torque detection value by passing through a low-pass filter a value obtained by subtracting motor inertia torque in terms of the steering shaft computed from the output of the above motor rotation angle acceleration detection means from the sum of the output of the steering torque detection means and the output of the above motor torque detection means.

According to a tenth aspect of the present invention, there is provided an electric power steering controller wherein motor rotation angle acceleration detection means for detecting the rotation angle acceleration of the motor is provided, and the road reaction torque detection means obtains a road reaction torque detection value by passing through a low-pass filter a value obtained by subtracting motor inertia torque in terms of the steering shaft computed from the output of the above motor rotation angle acceleration detection means from the sum of the output of the steering torque detection means and the target value of motor torque in terms of the steering shaft computed from the target value of current for driving the motor.

According to an eleventh aspect of the present invention, there is provided an electric power steering controller wherein motor current detection means for detecting a current running through the motor is provided, and the road reaction torque detection means obtains a road reaction torque detection value by passing through a low-pass filter a motor torque value in the terms of the steering shaft computed from the output of the above motor current detection means.

According to a twelfth aspect of the present invention, there is provided an electric power steering controller wherein motor current detection means for detecting a current running through the motor and power voltage detection means for detecting power voltage applied to the motor are provided, and the rotation angle acceleration detection means computes the rotation angle acceleration of the motor from the output of the above motor current detection means and the product of the output of the power voltage detection means and the duty ratio of a PWM signal for driving the motor.

According to a thirteenth aspect of the present invention, there is provided an electric power steering controller wherein the road reaction torque detection means obtains the output of the steering torque detection means through a low-pass filter.

According to a fourteenth aspect of the present invention, there is provided an electric power steering controller wherein the break frequency of the above low-pass filter is set to a frequency band at which the driver generally controls the steering wheel and the influence of the friction torque of the steering unit upon a detection error which affects the road reaction torque detection value is minimized.

According to a fifteenth aspect of the present invention, there is provided an electric power steering controller wherein the break frequency of the above low-pass filter of the road reaction torque detection means is set according to the output of the car speed detection means.

According to a sixteenth aspect of the present invention, there is provided an electric power steering controller wherein the output of the steering torque detection means is applied to the road reaction torque detection means through the low-pass filter.

According to a seventeenth aspect of the present invention, there is provided an electric power steering controller wherein the output of the steering torque detection means which is applied to the road reaction torque detection means of the sixth aspect has a dead zone at around "0" of the steering torque signal.

According to an eighteenth aspect of the present invention, there is provided an electric power steering controller wherein the output of the road reaction torque detection means of the first aspect has a dead zone at around "0" of the road reaction torque.

According to a nineteenth aspect of the present invention, there is provided an electric power steering controller wherein the road reaction torque addition control means comprises distortion measuring means in a rack.

According to a twentieth aspect of the present invention, there is provided a method of controlling an electric power steering controller which comprises the steps of detecting road reaction torque received by the tires from the surface of a road and controlling the motor for generating torque for assisting the steering force of the steering system based on this road reaction torque.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Preferred embodiments of the present invention will be described hereinunder with reference to the accompanying drawings.

The same or corresponding elements as those of the prior art are given the same reference symbols and their descriptions are omitted. The present invention can solve the problems of the prior art with only the software of a microcomputer. The hardware of the controller is the same as that of the prior art and its description is omitted.
Embodiment 1

Figure 1:
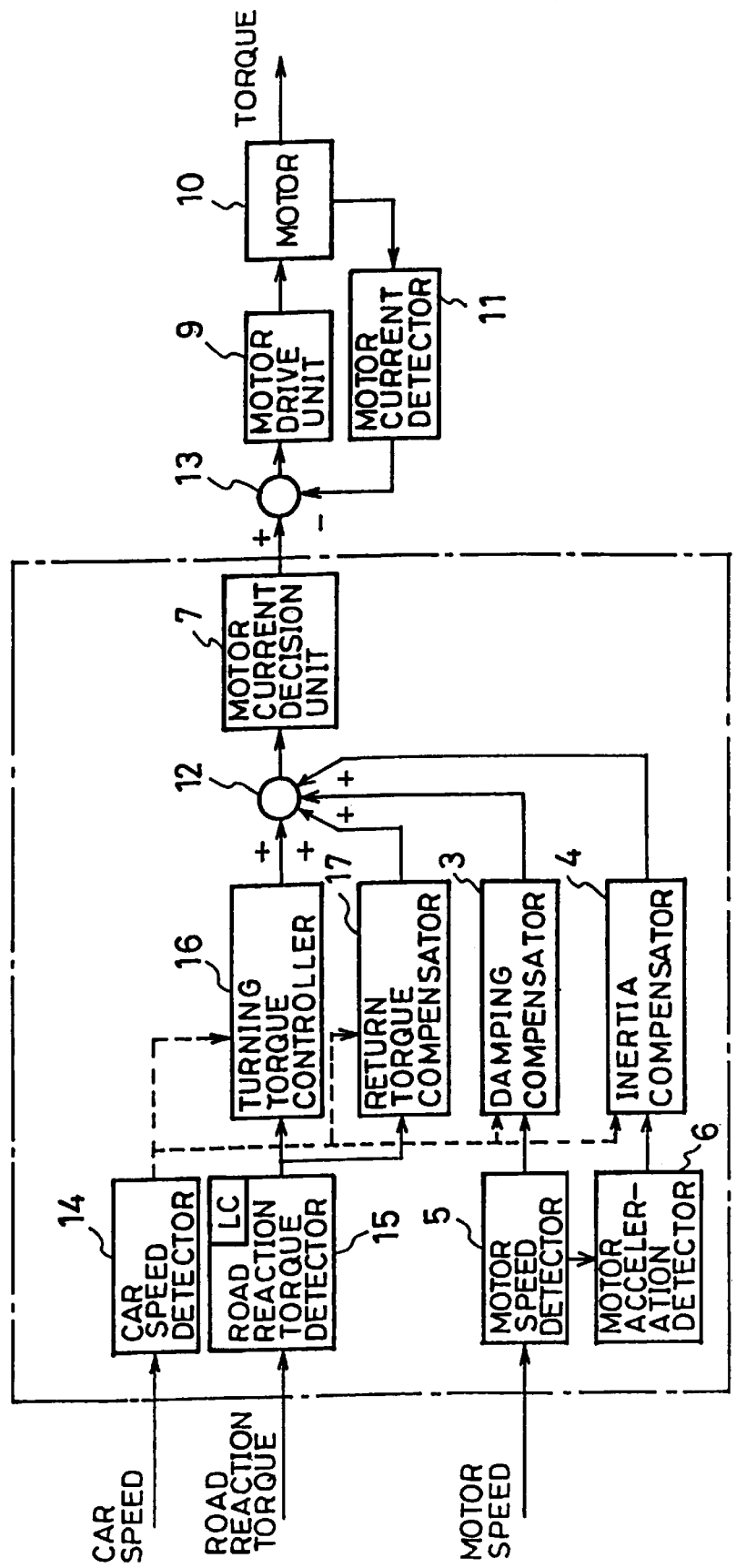
FIG. 1 is a block diagram showing an electric power steering controller according to Embodiment 1 of the present invention.

FIG. 1 is a block diagram showing an electric power controller according to Embodiment 1 of the present invention. In the figure, reference numeral 15 denotes a road reaction torque detection means for detecting the road reaction torque returning the steering wheel to its starting point and thereby returning the front wheels controlled by the steering wheel to their starting point, 16 a turning torque controller for outputting a turning assist torque signal for causing the motor 10 to generate torque in a direction opposite to the direction of the detected road reaction torque based on a road reaction torque signal detected by the road detection torque detector 15, and 17 a return torque compensator for outputting a handle return assist torque signal for causing the motor 10 to generate torque in a direction for returning the steering wheel to its starting point based on the road reaction torque signal. In this Embodiment 1, the turning torque controller 16 and return torque compensator 17 constitute road reaction torque addition control means for controlling the torque of the motor 10 based on the detected road reaction torque.

The road reaction torque detector 15 comprises distortion measuring means such as a load cell LC or distortion gauge on one or both sides of a front-wheel side rack for connecting the front wheels to the steering shaft, to detect compression force applied to the rack from road reaction torque $T_{react}$ from the tires of the front wheels as the distortion of the rack, and to detect road reaction torque $T_{react}$ by multiplying the above compression force by the offset $X_{offset}$ from the rotation center of the rack and the tires.

Denoted by 3 is a damping compensator for computing a damping compensation signal based on a motor speed signal detected by the motor speed detector 5, 4 an inertia compensator for computing an inertia compensation signal based on a motor acceleration signal detected by the motor acceleration detector 6, 7 a motor current decision unit for computing a target current signal from target torque which is the sum of a turning assist torque signal, handle return assist torque signal, damping compensation signal and inertia compensation signal, computed by the first adder 12, and 9 a motor drive unit for determining voltage to be applied to the motor 10 based on a difference obtained by the second adder 13 between a target current signal and a motor current signal detected by the motor current detector 11 and applying the above voltage to the motor 10. The motor 10 generates torque substantially proportional to a motor current value which changes according to the applied voltage to drive the steering unit. Reference numeral 14 denotes a car speed detector for detecting car speed and outputting the detected car speed signal to the turning torque controller 16, return torque compensator 17, damping compensator 3 and inertia compensator 4.

A description is subsequently given of the operation of the above electric power steering controller with reference to the flow chart of FIG. 2. The difference of Embodiment 1 of the present invention from the prior art is algorithm for computing a target current, surrounded by a one-dot chain line in the block diagram of FIG. 1. The control of a motor current is general control such as PID type current F/B control or open-loop control based on a target current and a motor speed signal. The control system may be either digital or analog control system.

Only the algorithm for computing a target current will be described hereinunder.

Figure 3:
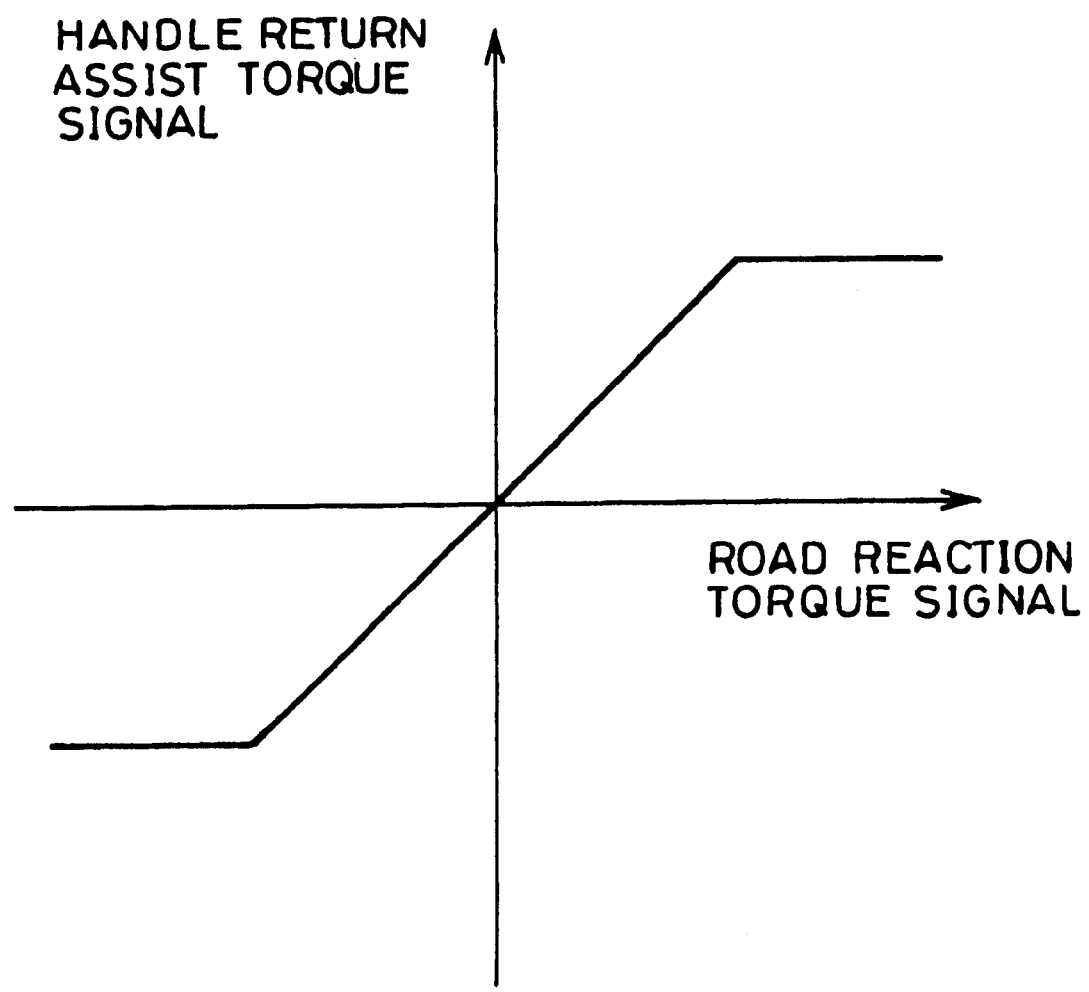
FIG. 3 is a diagram showing the characteristics of a return torque compensator.

In the first step S101, a road reaction torque signal detected by the road reaction torque detector 15 is read and stored in a memory. In the following step S102, a motor speed signal detected by the motor speed detector 5 is read and stored in the memory. In step S103, the motor acceleration detector 6 differentiates the above motor speed signal to obtain a motor acceleration signal and stores it in the memory. In step S104, the turning torque controller 16 makes a map computation on the above road reaction torque signal to obtain a turning assist torque signal and stores it in the memory. In this respect, the map for the above turning assist torque signal is formulated such that the motor 10 can generate torque in a direction opposite to the direction of the above road reaction torque. In the subsequent step S105, the return torque compensator 17 makes a map computation on the road reaction torque signal to obtain a handle return assist torque signal and stores it in the memory. The above handle return assist torque signal is intended to avoid a phenomenon that the steering wheel does not return to its starting point automatically when the road reaction torque is smaller than friction torque in the steering unit. As shown in FIG. 3, it is limited by a limiter which is a value approximate to the friction torque in the steering unit as the upper limit and obtained by multiplying the road reaction torque signal by a proportional gain at a range below the above limiter.

Thereafter, the damping compensator 3 multiplies the motor speed signal by a proportional gain to obtain a damping compensation signal and stores it in the memory in step S106 and the inertia compensator 4 multiplies the motor acceleration signal by a proportional gain to obtain an inertia compensation signal and stores it in the memory in step S107.

The routine proceeds to step S108 in which the first adder 12 adds up the turning assist torque signal, handle return assist torque signal, damping compensation signal and inertia compensation signal obtained in the above steps S104 to 107 to obtain target torque and stores it in the memory. In the following step S109, the motor current decision unit 7 multiplies the target torque obtained in the above step S108 by a gain to obtain a target current and stores it in the memory. The gain at this point is the inverse of the torque constant in terms of the steering shaft of the motor 10.

Control parameters such as the gains of the turning torque controller 16, return torque compensator 17, damping compensator 3 and inertia compensator 4 are set according to a car speed signal from the car speed detector 14. For a vehicle equipped with a steering unit having strong damping force or a vehicle equipped with a motor having small inertia moment in terms of a steering shaft, the gains of the damping compensator 3 and the inertia compensator 4 may be set to "0". In this case, the motor speed detector 5, motor acceleration detector 6, damping compensator 3 and inertia compensator 4 become unnecessary.

The motor speed detector 5 used in this Embodiment 1 may be a motor speed sensor such as a tachometer, that detects motor speed by obtaining a time interval between the pulse outputs of a rotary encoder, or that detects motor speed from a counter voltage obtained by subtracting the product of a current value applied to the motor and the resistance value of a coil from a voltage applied to the motor.

Generally speaking, the car driver returns the steering wheel to the center with its self-returning force generated from road reaction torque by releasing his/her hands from the steering wheel after turning it in many cases, thereby reducing steering labor. In the electric power steering controller of the prior art, the returnability of the steering wheel is deteriorated by the friction torque's of the motor 10 and the gears. That is, when only a steering torque signal is detected to determine target torque and the driver releases his/her hands from the steering wheel after turning it, the steering torque signal becomes "0", thereby making it impossible to generate handle return torque. Further, even when target torque is determined based on a steering torque signal and a motor revolution signal, even if the revolution of the motor 10 stops, the motor 10 cannot generate torque in a direction for returning the steering wheel.

In contrast to this, the electric power steering controller of Embodiment 1 comprises the road reaction torque detector 15 for detecting road reaction torque which is substantially proportional to the angle of the steering wheel even when the driver releases his/her hands from the steering wheel and outputting a road reaction torque signal and the turning torque controller 16 and the return torque compensator 17 both of which constitute the road reaction torque addition control means for computing a turning assist toque signal and a handle return assist torque signal based on the above road reaction torque signal so as to control the torque of the motor 10. Therefore, after the driver releases his/her hands from the steering wheel, the motor 10 can output torque in a direction for returning the steering wheel, thereby making it possible to return the steering wheel to the center without fail.

Figure 2:
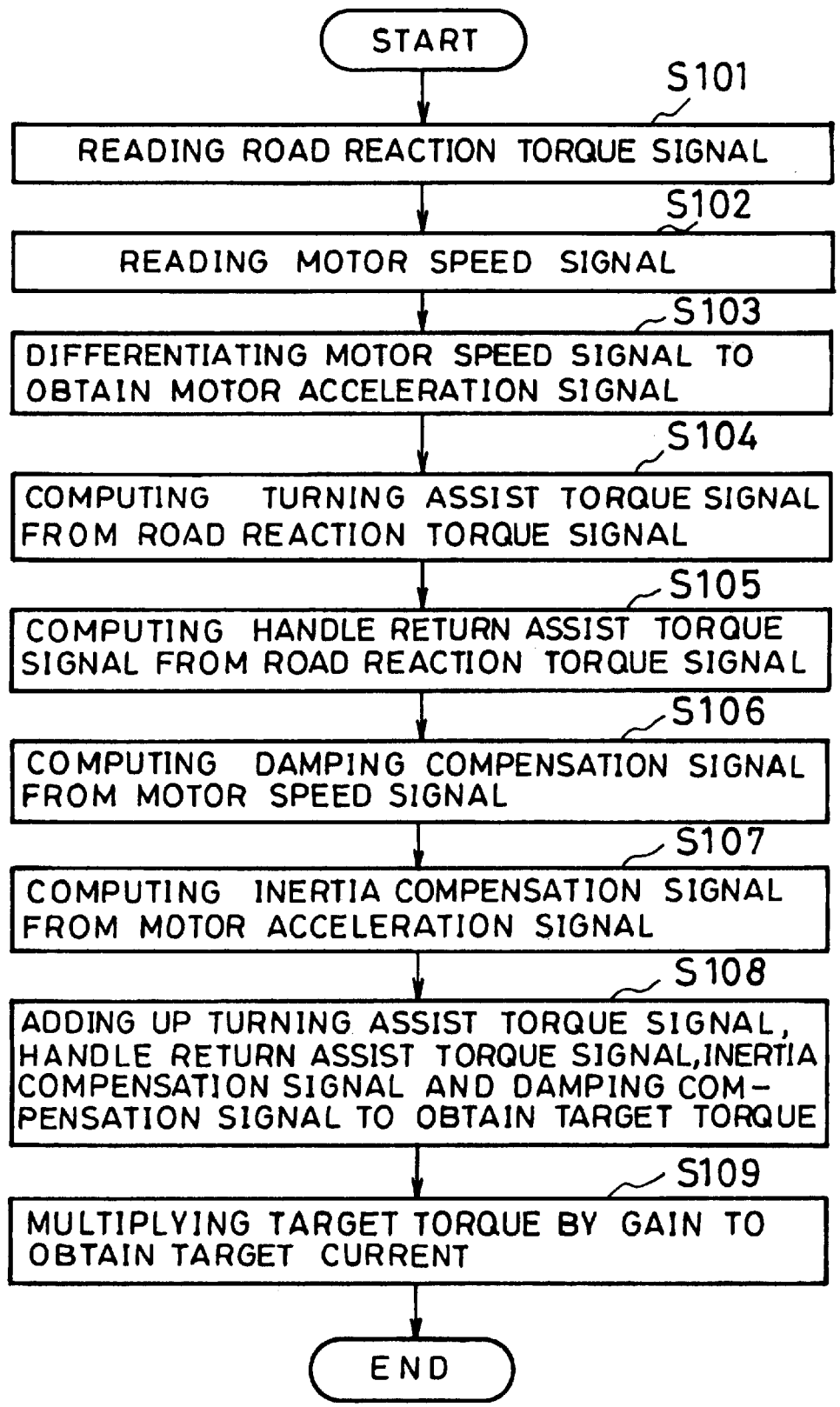
FIG. 2 is a flow chart for explaining the operation of the electric power steering controller according to Embodiment 1 of the present invention.

In Embodiment 1, a map computation is made in the steps S104 and S105 of FIG. 2 and the multiplication of the gain is made in the steps S106 and S107. In all of these steps, the multiplication of the gain or map computation may be made.

A single map for synthesizing both the turning assist torque signal and the handle return assist torque signal may be formulated to combine the steps S104 and S105 so that a map computation is made on a road reaction toque signal to compute a road reaction torque addition control signal which is the sum of a turning assist torque signal and a handle return assist torque signal.

Embodiment 2

Figure 4:
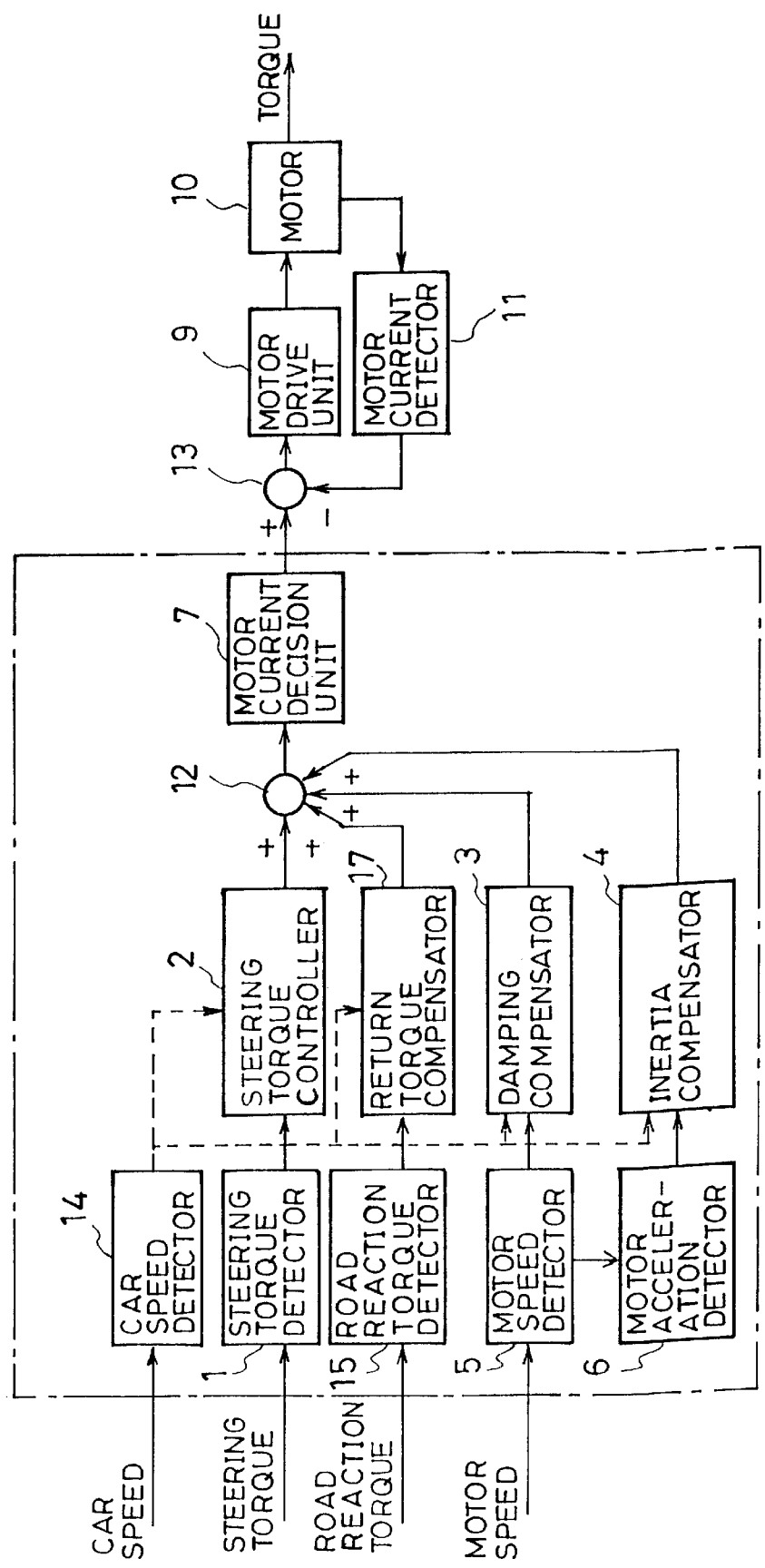
FIG. 4 is a block diagram showing an electric power steering controller according to Embodiment 2 of the present invention.

FIG. 4 is a block diagram showing an electric power steering controller according to Embodiment 2 of the present invention. In the figure, reference numeral 1 denotes a steering torque detector which is steering torque detection means for detecting steering torque, 2 a steering torque controller which is steering assist control means for computing a steering assist torque signal based on a steering torque signal which is the output of the steering torque detector 1, 15 a road reaction torque detector for detecting road reaction torque for returning the angles of the front wheels to their starting points, and 17 a return torque compensator for outputting a handle return assist torque signal for causing the motor 10 to generate torque for returning the steering wheel to its starting point based on a road reaction torque signal which is the output of the road reaction torque detector 15. In this Embodiment 2, the above return torque compensator 17 constitutes road reaction torque addition control means.

Denoted by 3 is a damping compensator, 4 an inertia compensator, 5 a motor speed detector, 6 a motor acceleration detector, 7 a motor current decision unit, 9 a motor drive unit, 10 a motor, 11 a motor current detector, 12 a first adder, 13 a second adder and 14 a car speed detector.

A description is subsequently given of the operation of the electric power steering controller according to Embodiment 2 with reference to the flow chart of FIG. 5. Only algorithm for computing a target current will be described hereinunder like Embodiment 1.

In the first step S201, a road reaction torque signal detected by the road reaction torque detector 15 is read and stored in the memory. In the subsequent step S202, a steering torque signal detected by the steering torque detector 1 is read and stored in the memory. In step S203, a motor speed signal detected by the motor speed detector 5 is read and stored in the memory. In step S204, the motor acceleration detector 6 differentiates the motor speed signal to obtain a motor acceleration signal and stores it in the memory.

In the following steps S205 and 206, the steering torque controller 2 corrects the phase of the steering torque signal by passing it through a phase compensator which is constructed with the software of a microcomputer to improve the frequency characteristics of the steering torque signal, makes a map computation on the phase compensated steering torque signal to obtain a steering assist torque signal and stores it in the memory.

In the following step S207, the return torque compensator 17 makes a map computation on the above road reaction torque signal to obtain a handle return assist torque signal and stores it in the memory. Instep S208, the damping compensator 3 multiplies the motor speed signal by a proportional gain to obtain a damping compensation signal and stores it in the memory. In step S209, the inertia compensator 4 multiplies the motor acceleration signal by a proportional gain to obtain an inertia compensation signal and stores it in the memory.

The routine proceeds to step S210 in which the first adder 12 adds up the steering assist torque signal, handle return assist torque signal, damping compensation signal and inertia compensation signal obtained in the above steps S206 to 209 to obtain target torque and stores it in the memory. Thereafter, instep S211, the motor current decision unit 7 multiplies the target torque obtained in the above step S210 by a gain to obtain a target current and stores it in the memory. The gain at this point is the inverse of the torque constant in terms of the steering shaft of the motor 10.

In this Embodiment 2, the control parameters of the steering torque controller 2, return torque compensator 17, damping compensator 3 and inertia compensator 4 change according to the output of the car speed detector 14 like the Embodiment 1. For a vehicle equipped with a steering unit having strong damping force and a vehicle equipped with a motor having small inertia moment in terms of the steering shaft, the gains of the damping compensator 3 and the inertia compensator 4 may be set to "0". In this case, the motor speed detector 5, motor acceleration detector 6, damping compensator 3 and inertia compensator 4 become unnecessary.

The steering torque controller 2 may be constituted to obtain a steering assist torque signal from a steering torque signal and a differentiated value thereof.

In this Embodiment 2, when the driver controls the steering wheel while holding it, a steering assist torque signal for assisting steering can be generated based on a steering torque signal and when the driver releases his/her hands from the steering wheel, a handle return assist torque signal for returning the steering wheel to its starting point can be generated based on a road reaction torque signal. Therefore, after the driver releases his/her hands from the steering wheel, the motor can output torque in a direction for returning the steering wheel and the steering wheel can be returned to the center without fail. That is, when the driver holds the steering wheel, conventional control algorithm is used directly and when he/she releases his/her hands from the steering wheel, control algorithm for returning the steering wheel to its starting point is added to improve the returnability of the steering wheel.

Figure 5:
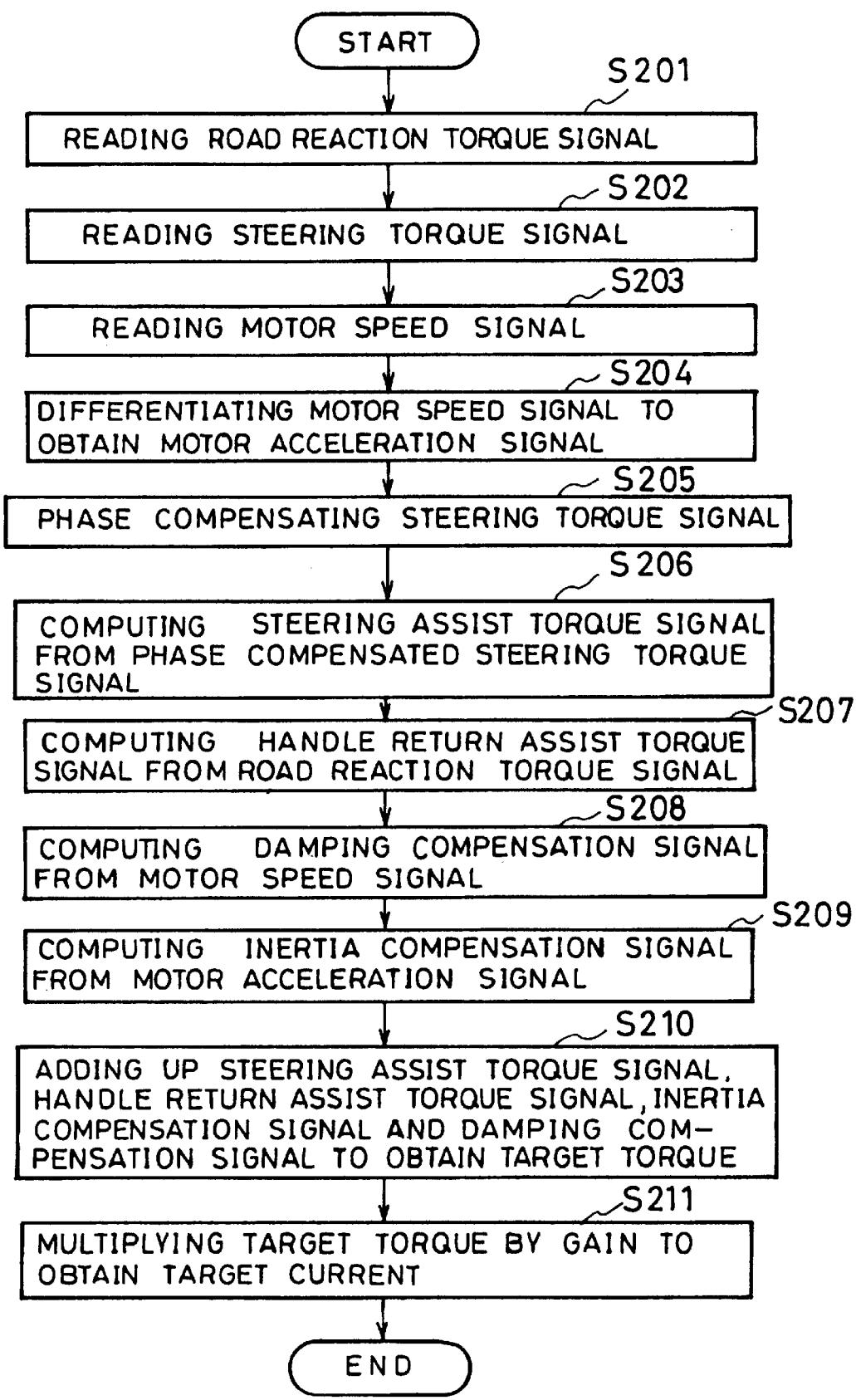
FIG. 5 is a flow chart for explaining the operation of the electric power steering controller according to Embodiment 2 of the present invention.

In this Embodiment 2, a map computation is made in the steps S206 and S207 of FIG. 5 and the multiplication of the gain is made in the steps S208 and S209. The multiplication of the gain or map computation may be made in all of these steps.

In this Embodiment 2, the phase compensator is constructed with the software of a microcomputer to improve the frequency characteristics of the steering torque signal. Alternatively, the frequency characteristics of the steering torque signal may be improved by an analog phase compensator and converted into a digital value which is then applied to a microcomputer. In this case, the step S205 becomes unnecessary.

Embodiment 3

Figure 6:
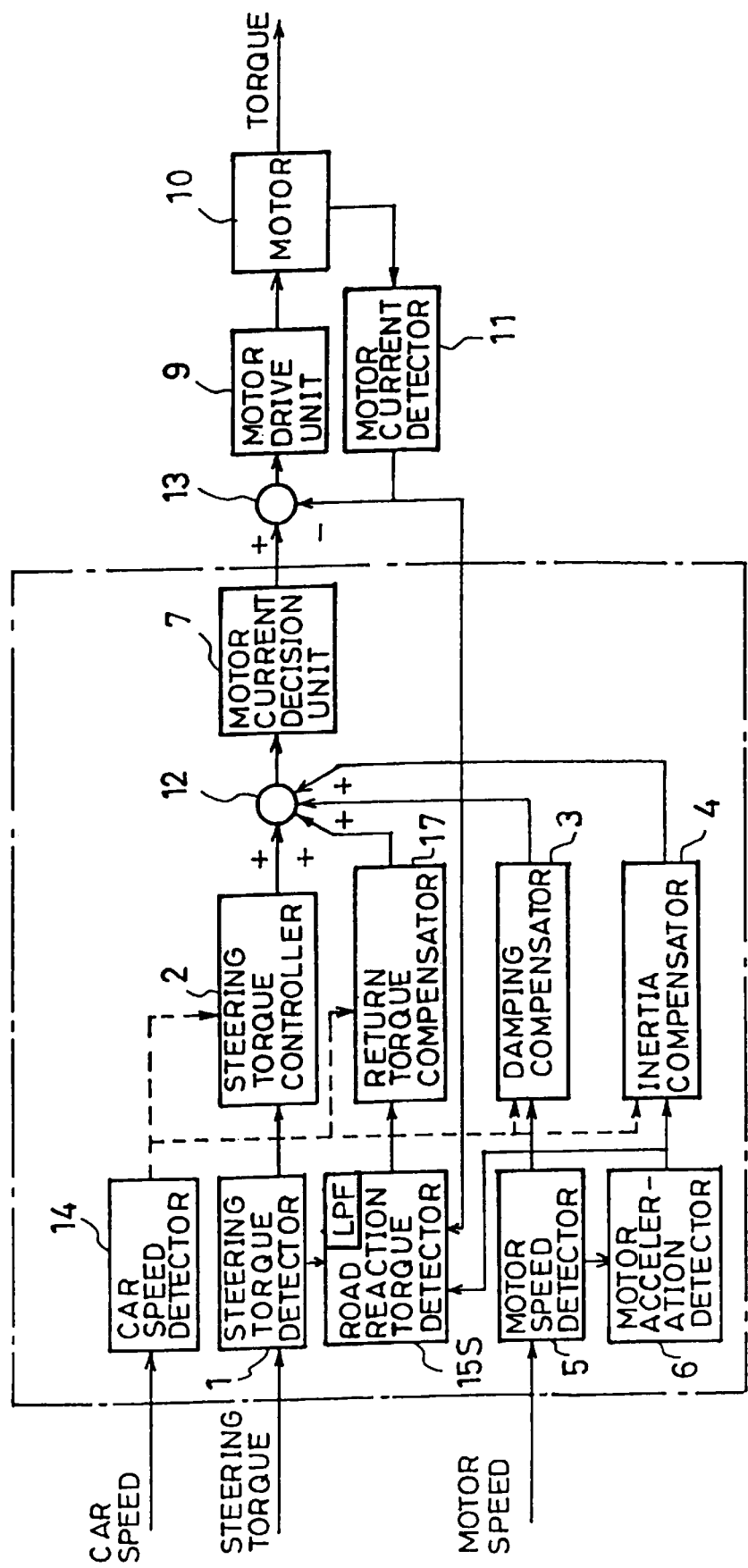
FIG. 6 is a block diagram showing an electric power steering controller according to Embodiment 3 of the present invention.

In Embodiment 2, road reaction torque is directly detected by the road reaction torque detector 15 comprising distortion measuring means such as a load cell. As shown in FIG. 6, the electric power steering controller of Embodiment 3 comprises, in place of the road reaction torque detector 15, a road reaction torque detector 15S which has a low-pass filter LPF, computes a road reaction torque signal from a steering torque signal, which is the output of the steering torque detector 1, a motor acceleration signal, which is the output of the motor acceleration detector 6, and a motor current value, which is the output of the motor current detector 11 and outputs it, and is constructed with the software of a microcomputer. Thereby, the road reaction torque detector 15 can be omitted and wiring therefor can be eliminated, thereby making it possible to reduce the size of the electric power steering controller.

The computation of the road reaction torque signal by the road reaction torque detector 15S will be detailed hereinafter.

A description is subsequently given of the operation of the electric power steering controller of Embodiment 3 with reference to the flow chart of FIG. 7.

In the first step S301, a steering torque signal detected by the steering torque detector 1 is read and stored in the memory. In the following step S302, a motor speed signal detected by the motor speed detector 5 is read and stored in the memory. In step S303, the motor acceleration detector 6 differentiates the motor speed signal to obtain a motor acceleration signal and stores it in the memory. In step S304, a motor current signal is read and stored in the memory.

In steps S305 and S306, the road reaction torque detector 15S carries out the following computation to obtain a road reaction torque signal.

In the step S305, the steering torque signal $T_{sens}$, the motor acceleration signal do corresponding to the rotation angle acceleration of the steering shaft and the motor current signal Itr are used to obtain a steady reaction signal $T_{rea\_est}$ from the following equation (1):

$$T_{rea\_est}=T_{sens}+K_t I_{mtr} - J \cdot d\omega \qquad (1)$$

wherein $K_t$ is the torque constant of the motor (in terms of the steering shaft) and J is the inertia moment of the steering unit.

In the subsequent step S306, a road reaction torque signal $T_{rea\_est}$ is obtained by carrying out a primary filter computation as shown in the following equation (2) with the low-pass filter provided in the road reaction torque detector 15S and stored in the memory.

$$dT_{rea\_est}/dt = -T_{rea\_est}/T_1 + T_{rea\_est}/T_1 \qquad (2)$$

wherein $T_1$ is the time constant of the primary filter which is set such that the break frequency $f_c = 1/(2\pi \cdot T_1)$ becomes between 0.05 to 1.0 Hz.

In the following steps S307 and S308, the steering torque controller 2 corrects the phase of the steering torque signal by passing it through a phase compensator and makes a map computation on the phase compensated steering torque signal to obtain a steering assist torque signal and stores it in the memory.

In step S309, the return torque compensator 17 makes a map computation on the above road reaction torque signal $T_{rea\_est}$ to obtain a handle return assist torque signal and stores it in the memory. The damping compensator 3 multiplies the motor speed signal by a proportional gain to obtain a damping compensation signal and stores it in the memory in step S310 and the inertia compensator 4 multiplies the motor acceleration signal by a proportional gain to obtain an inertia compensation signal and stores it in the memory in step S311.

The routine proceeds to step S312 in which the first adder 12 adds up the steering assist torque signal, handle return assist torque signal, damping compensation signal and inertia compensation signal obtained in the above steps S308 to S311 to obtain target torque and stores it in the memory. In step S313, the motor current decision unit 7 multiplies the target torque obtained in the above step S312 by a gain to obtain a target current and stores it in the memory. The gain at this point is the inverse of the torque constant in terms of the steering shaft of the motor 10.

The above steps S301 to S313 are repeated.

The reason why the detection of road reaction torque is made possible by the above expressions (1) and (2) is given below.

The equation of motion of the steering unit is the following equation (3):

$$J \cdot d\omega_s/dt = T_{hdl} + T_{mtr} - T_{fric} - T_{react} \qquad (3)$$

wherein $d\omega_s/dt$ is the rotation angle acceleration of the steering shaft, $T_{hdl}$ is steering torque, $T_{mtr}$ is the output torque of the motor (in terms of the steering shaft), $T_{fric}$ is friction torque in the steering unit and $T_{react}$ is road reaction torque (in terms of the steering shaft).

To obtain the road reaction torque $T_{react}$, the above equation (3) can be rearranged into the following equation (4).

$$T_{react} = T_{hdl} + T_{mtr} - J \cdot d\omega_s/dt - T_{fric} \qquad (4)$$

Therefore, the road reaction torque $T_{react}$ can be obtained from the steering torque, the output torque of the motor, the rotation angle acceleration of the steering shaft and friction torque in the steering unit. The steering torque signal $T_{sens}$ can be used as the steering torque $T_{hdl}$ and a value obtained by multiplying the motor current signal $I_{mtr}$ by a torque constant $K_t$ can be used as the output torque $T_{mtr}$ of the motor. The motor acceleration signal dω can be used as the rotation angle acceleration of the steering shaft (dω$_s$/dt). Therefore, the road reaction torque from which the influence of the friction torque $T_{fric}$ in the steering unit is removed can be detected from the above equation (1).

The friction torque $T_{fric}$ functions as a relay for the rotation speed of the steering unit. It is widely known in the field of control engineering that the relay can be equivalently represented by gain and phase in accordance with an equivalent linearization method. Therefore, the road reaction torque signal $T_{rea\_est}$ can be obtained by adjusting the gain and phase of a steady reaction signal $T'_{rea\_est}$ detected from the above equation (1) with the primary filter of the above equation (2)

That is, the filter is used as the most common means of adjusting the gain and phase. The filter can adjust the gain and phase at a frequency range higher than a break frequency. When the break frequency is set to a range from 0.5 to 1.0 time the frequency to be adjusted, the gain can be adjusted to a range from 1 to 0.5 time and the phase can be adjusted to a range from 0 to −20 deg so that the influence of friction torque can be canceled in most cases. Since the steering frequency generally used in an automobile is 0.1 to 1 Hz, the break frequency is set to a level 0.5 to 1 time the above steering frequency, that is, a range from 0.05 to 1 Hz, the influence of friction torque can be canceled. The concrete break frequency is set with an eye on a steering frequency which makes control based on the detected road reaction torque signal the most effective.

Thus, in this Embodiment 3, the road reaction torque detector 15S for detecting a road reaction torque signal $T_{rea\_est}$ from the steering torque signal $T_{sens}$, motor acceleration signal dω (rotation angle acceleration of the steering shaft) and motor current signal $I_{mtr}$ is provided, whereby the need for the road reaction torque detector 15 and wiring therefor is eliminated, thereby making it possible to reduce the cost of the electric power steering controller.

In Embodiment 3, a signal before phase compensation is used as the steering torque signal $T_{sens}$—to be applied to the road reaction torque detector 15S. When the phase compensator for improving the frequency characteristics of the steering torque detector 1 is an analog phase compensator, a signal after phase compensation may be used as the steering torque signal $T_{sens}$.

The phase compensator for improving the frequency characteristics of the steering torque signal may be constructed with the software of a microcomputer. Alternatively, an analog phase compensator may be used to improve the frequency characteristics of the steering torque signal which is then converted into digital data to be applied to the microcomputer. In this case, the step S307 becomes unnecessary.

In the above example, the steady reaction signal $T'_{rea\_est}$ is obtained from the steering torque signal $T_{sens}$, motor acceleration signal dω (rotation angle acceleration of the steering shaft) and motor current signal $I_{mtr}$ using the equation (1) below in the step S305. For an electric power steering controller in which motor inertia torque is smaller than a road reaction torque detection value, such as an electric power steering controller equipped with a small-sized motor or brushless motor, a motor inertia torque term (−J·dω) may be ignored. For an electric power steering controller in which motor torque in terms of the steering shaft at a steering range which requires the operation of road reaction torque addition control is smaller than a road reaction torque detection value, a motor torque term in terms of the steering shaft may be ignored.

$$T'_{rea\_est}=T_{sens}+K_t I_{mtr}-J\cdot d\omega \quad (1)$$

wherein $K_t$ is the torque constant of the motor (in terms of the steering shaft) and J is the inertia moment of the steering unit.

Since at least one of the motor inertia torque term and the motor torque term in terms of the steering shaft can be ignored at this point, the computation of the terms becomes unnecessary, thereby making it possible to reduce the operation load of the microcomputer.

Embodiment 4

Figure 8:
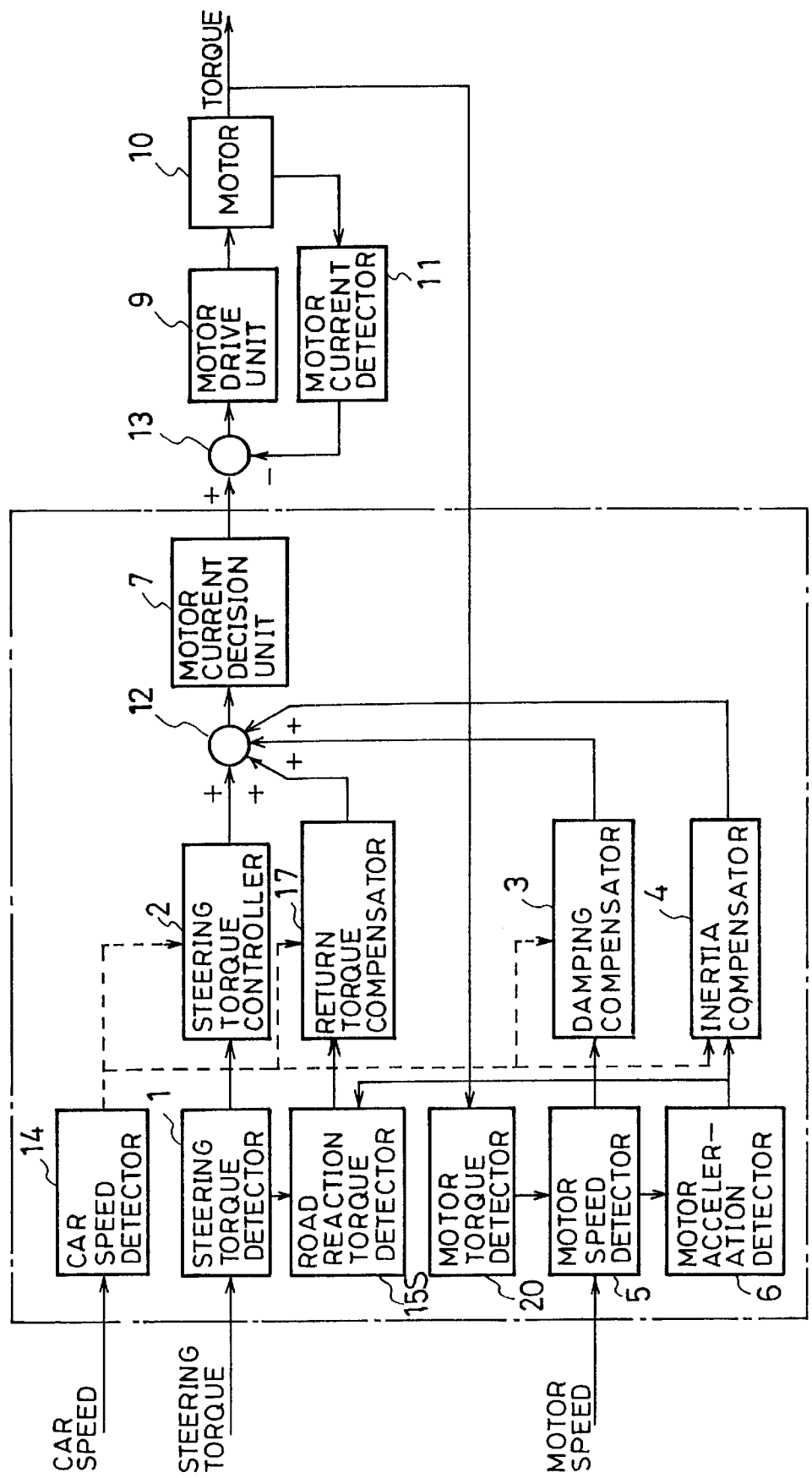
FIG. 8 is a block diagram showing an electric power steering controller according to Embodiment 4 of the present invention.

In Embodiment 3, the output torque of the motor is obtained by multiplying the output $I_{mtr}$ of the motor current detector 11 by the torque constant $K_t$ of the motor in terms of the steering shaft. In the electric power steering controller of Embodiment 4, as shown in FIG. 8, a motor torque detector 20 which comprises distortion measuring means, such as a load cell, and detects the output torque of the motor is provided to detect the torque of the output shaft of the motor 10 directly. The detection accuracy of the output torque of the motor can be improved by detecting the torque of the output shaft of the motor 10 directly and the road reaction torque can be detected accurately because it is not influenced by the noise of a motor current signal as the output $I_{mtr}$ of the motor current detector 11 is not used.

Figure 9:
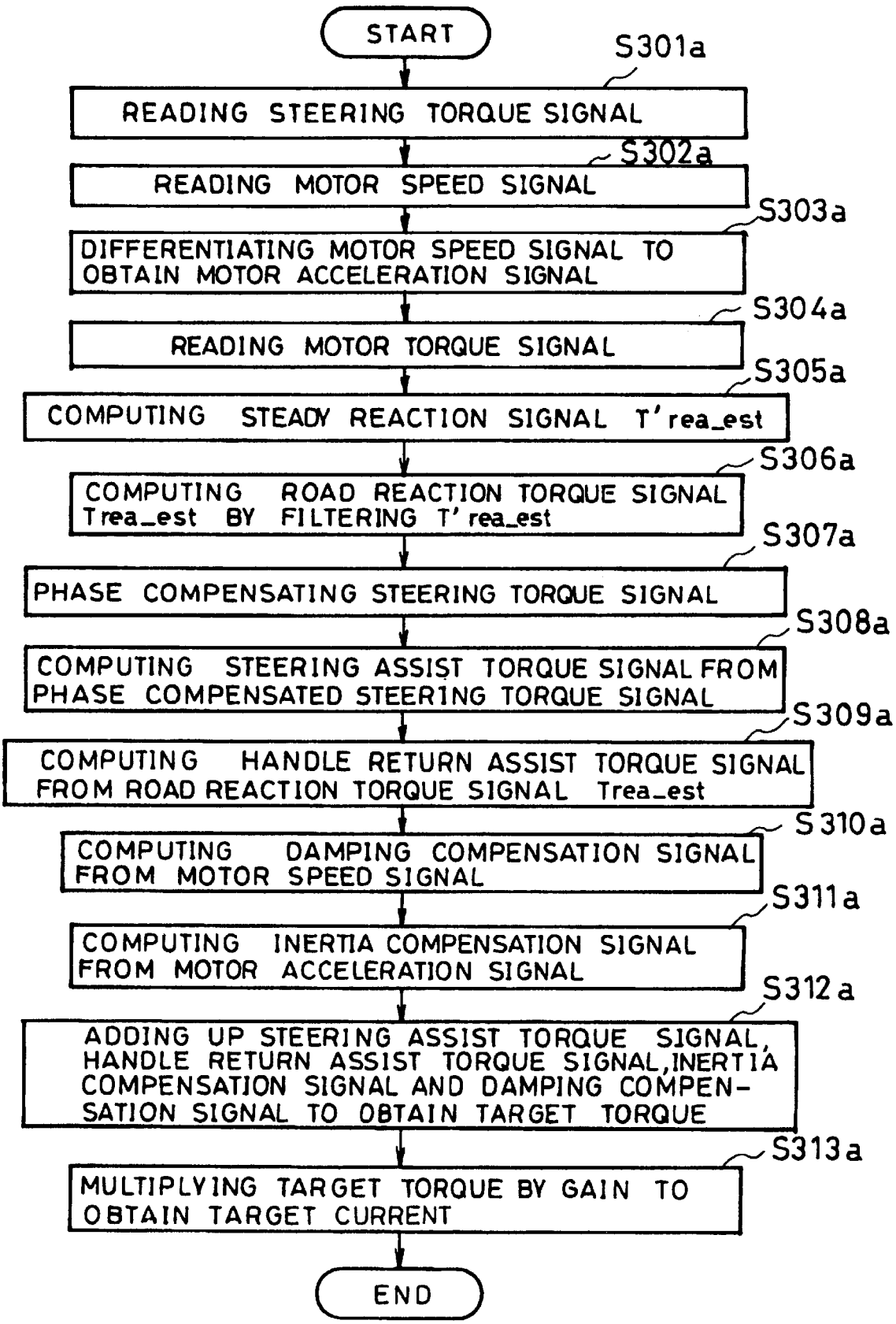
FIG. 9 is a flow chart for explaining the operation of the electric power steering controller according to Embodiment 4 of the present invention.

A description is subsequently given of the operation of the electric power steering controller of Embodiment 4 with reference to the flow chart of FIG. 9. Since steps from reading a steering torque signal (step S301a) to the computation of a motor acceleration signal dω (step S303a) are the same as the above steps S301 to S303 of the flow chart of FIG. 7, their descriptions are omitted.

In step S304a, the output of the motor torque detector 20 in terms of the steering shaft is converted into digital data which is then read and stored in the memory as a motor torque signal $T_m$. In the following step S305a, a steady reaction signal $T'_{rea\_est}$ is obtained from the steering torque signal $T_{sens}$, the motor acceleration signal dω corresponding to the rotation angle acceleration of the steering shaft and the above motor torque signal $T_m$ using the following equation (5).

$$T'_{rea\_est}=T_{sens}+T_m-J\cdot d\omega \quad (5)$$

In step S306a, the steady reaction signal $T'_{rea\_est}$ obtained using the above equation (5) is used to carry out the primary filter computation of the equation (2) shown in the above Embodiment 3 so as to obtain a road reaction torque signal $T_{rea\_est}$ which is then stored in the memory.

Figure 7:
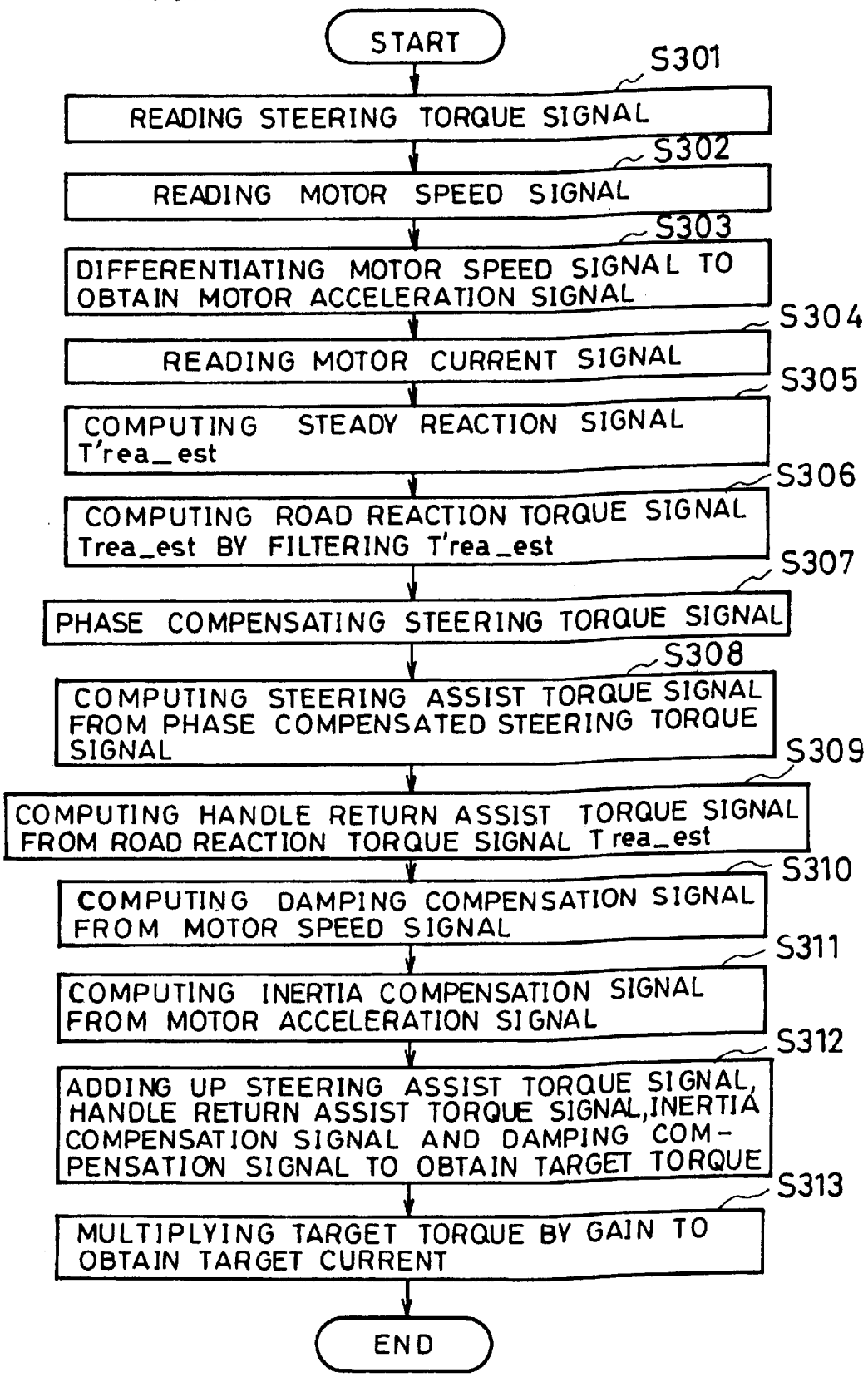
FIG. 7 is a flow chart for explaining the operation of the electric power steering controller according to Embodiment 3 of the present invention.

Since the following steps S307a to S313a are the same as the steps S307 to S313 of FIG. 7 of Embodiment 3, their descriptions are omitted.

Thus, as the output torque $T_m$ of the motor is directly detected from the output of the motor torque detector 20 in this Embodiment 4, an electric power steering controller which has high motor torque detection accuracy and is not affected by the noise of a motor current signal can be realized.

Embodiment 5

Figure 10:
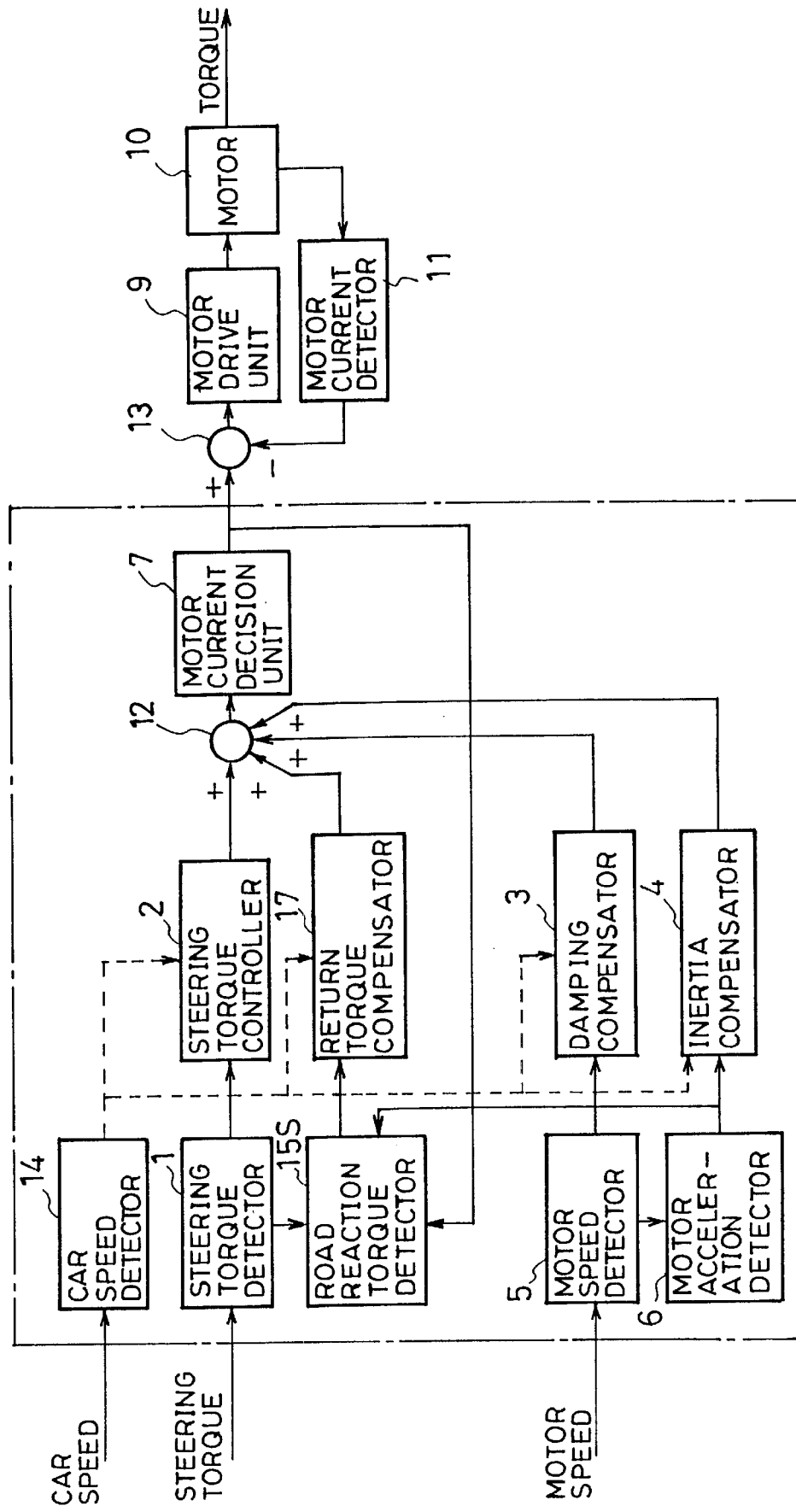
FIG. 10 is a block diagram showing an electric power steering controller according to Embodiment 5 of the present invention.

In Embodiment 3, the output torque of the motor is obtained by multiplying the output $I_{mtr}$ of the motor current detector 11 by the torque constant $K_t$ of the motor in terms of the steering shaft. In the electric power steering controller of Embodiment 5, as shown in FIG. 10, a motor current control target value $I_t$ which is the output of the motor current decision unit 7 is used in place of the output $I_{mtr}$ of the motor current detector 11 to detect the output torque of the motor. The motor current control target value $I_t$ is computed and stored in the memory in the step S313 of the flow chart of FIG. 7.

That is, in Embodiment 3, the processing routine from the step S301 to the step S313 is repeated to obtain the motor current control target value $I_t$ using the output $I_{mtr}$ of the motor current detector 11 detected in the step S304 to control the motor 10. In this Embodiment 5, after the motor current control target value $I_t$ is obtained, the motor current control target value $I_t$ which is a motor control current and not $I_{mtr}$ detected in the above step S304 is used to detect the output torque of the motor, thereby making it possible to improve the detection accuracy of the output torque of the motor. Further, road reaction torque can be detected with high accuracy because it is not influenced by the noise of the motor current signal.

A description is subsequently given of the operation of the electric power steering controller of this Embodiment 5.

Figure 11:
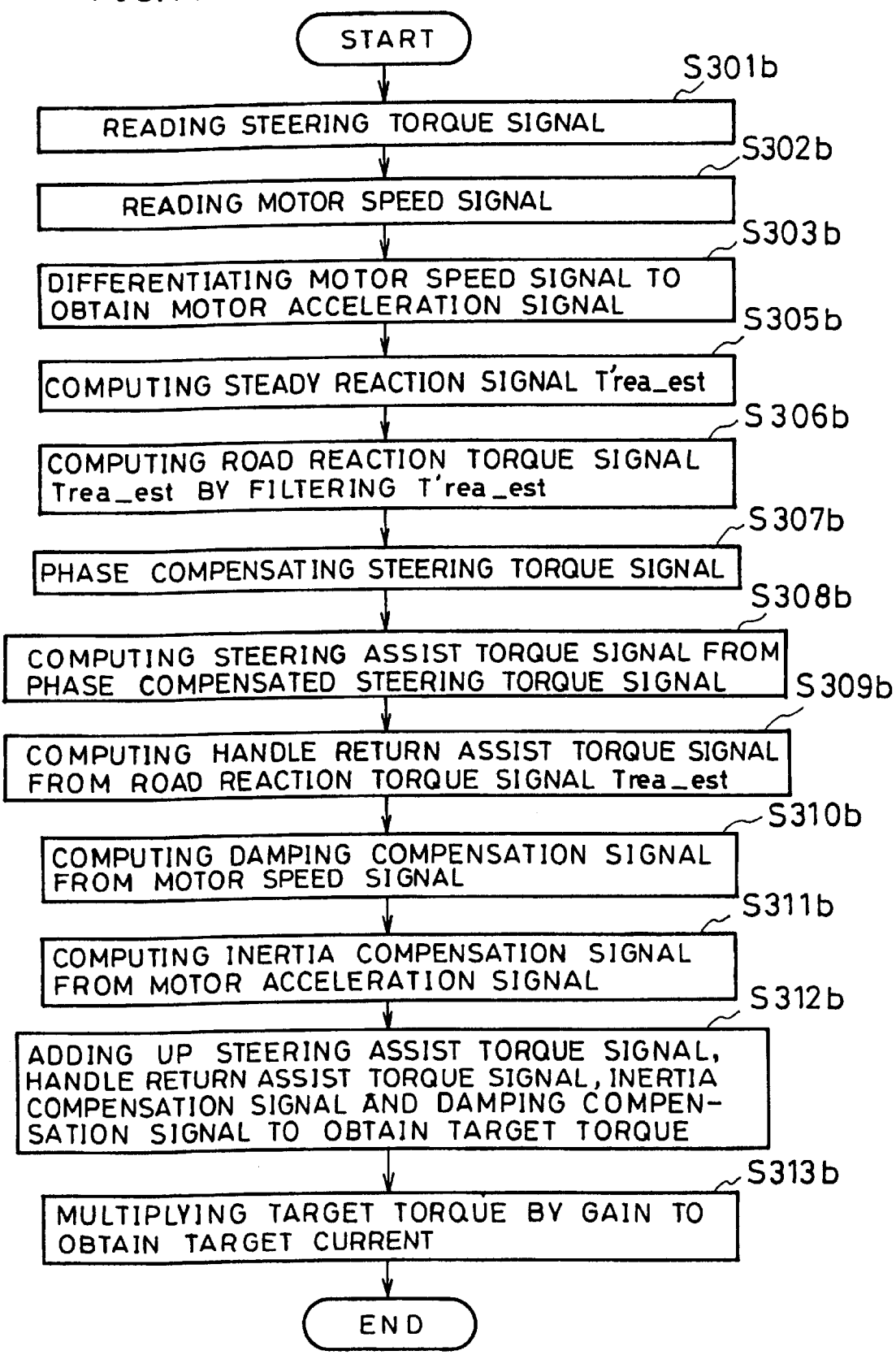
FIG. 11 is a flow chart for explaining the operation of the electric power steering controller according to Embodiment 5 of the present invention.

According to the flow chart of FIG. 7, after the motor current control target value It is obtained and stored in the memory, the routine proceeds to the processing routine shown in the flow chart of FIG. 11. In step S301b, a steering torque signal detected by the steering torque detector 1 is read and stored in the memory. In the following step S302b, a motor speed signal detected by the motor speed detector 5 is read and stored in the memory. In step S303b, the motor acceleration detector 6 differentiates the motor speed signal to obtain a motor acceleration signal and stores it in the memory.

In the processing routine of FIG. 11, reading of the motor current signal $I_{mtr}$ which is carried out in the step S304 of FIG. 7 is not carried out and the routine proceeds to step S305b to obtain a steady reaction signal $T'_{rea\_est}$ from the steering torque signal $T_{sens}$, the motor acceleration signal dω corresponding to the rotation angle acceleration of the steering shaft and the motor current control target signal $I_t$ computed in the previous cycle of the processing routine and stored in the memory using the following equation (6).

$$T'_{rea\_est}=T_{sens}+K_i \cdot I_t-J \cdot d\omega \qquad (6)$$

In step S306b, a road reaction torque signal $T_{rea\_est}$ is obtained by making the primary filter computation of the equation (2) shown in the above Embodiment 3 on the steady reaction signal $T'_{rea\_est}$ obtained using the above equation (7) and stored in the memory.

Since the following steps S307b to S313b are the same as the steps S307 to S313 of FIG. 7 of Embodiment 3, their descriptions are omitted.

In this Embodiment 5, the motor current control target signal $I_t$ which is the output of the motor current decision unit 7 is used in place of the motor current signal $I_{mtr}$ to detect the torque of the output shaft of the motor, thereby making it possible to realize an electric power steering controller which has high motor torque detection accuracy and is not influenced by the noise of a motor current signal.

Embodiment 6

Figure 12:
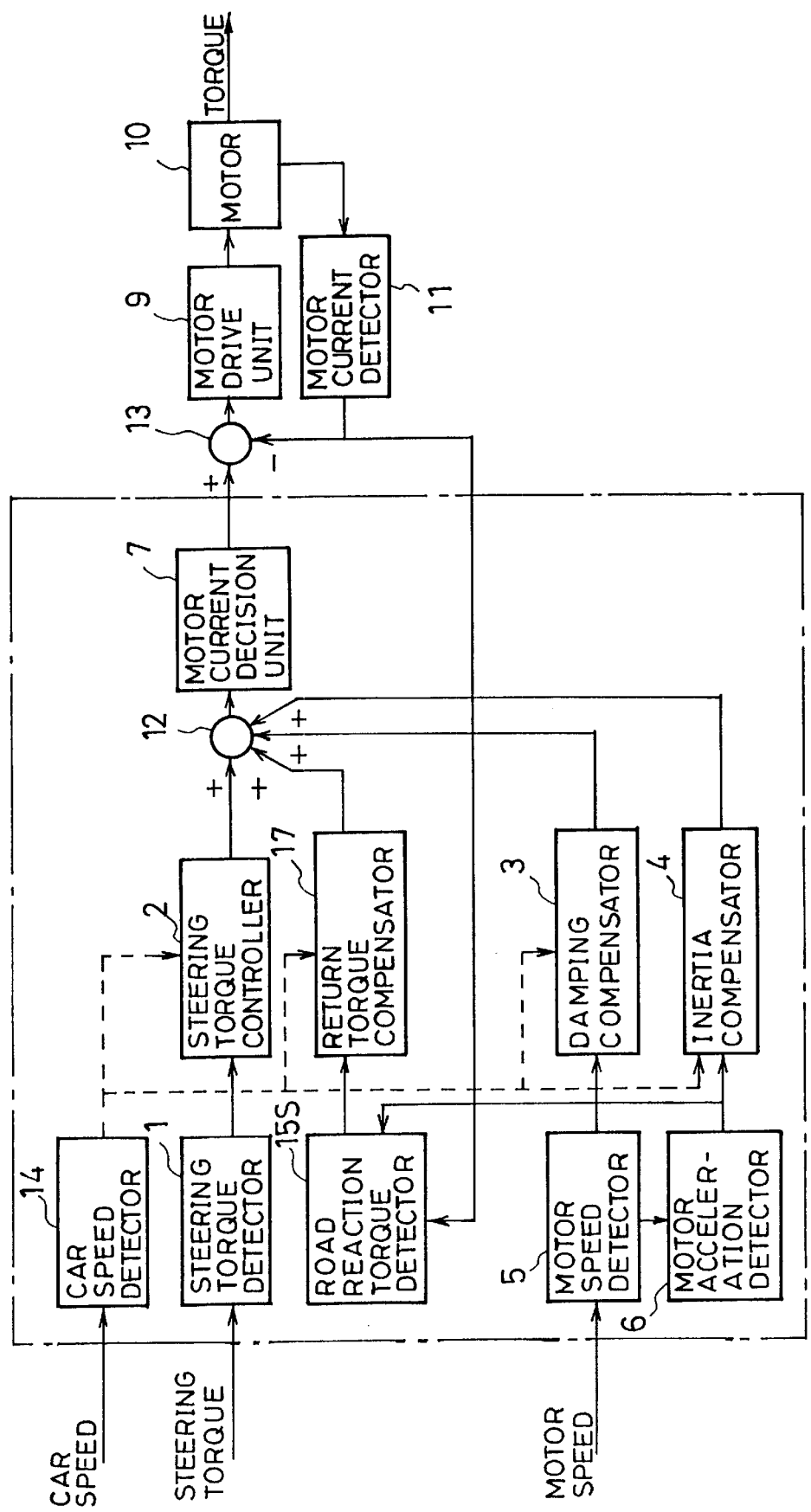
FIG. 12 is a block diagram showing an electric power steering controller according to Embodiment 6 of the present invention.

In Embodiment 3, a road reaction torque $T_{rea\_est}$ is detected using a steering torque signal $T_{sens}$ which is the output of the steering torque detector 1. In this Embodiment 6, the road reaction torque $T_{rea\_est}$ is detected from the output of the motor current detector 11 and a motor acceleration signal dω output from the motor acceleration detector 6 as shown in FIG. 12, making use of the fact that the output of the steering torque detector 1 is substantially proportional to the output of the motor current detector 11. Thereby, the capacity of the memory can be saved and the constitution and arithmetic processing of an arithmetic processing program can be simplified.

Figure 13:
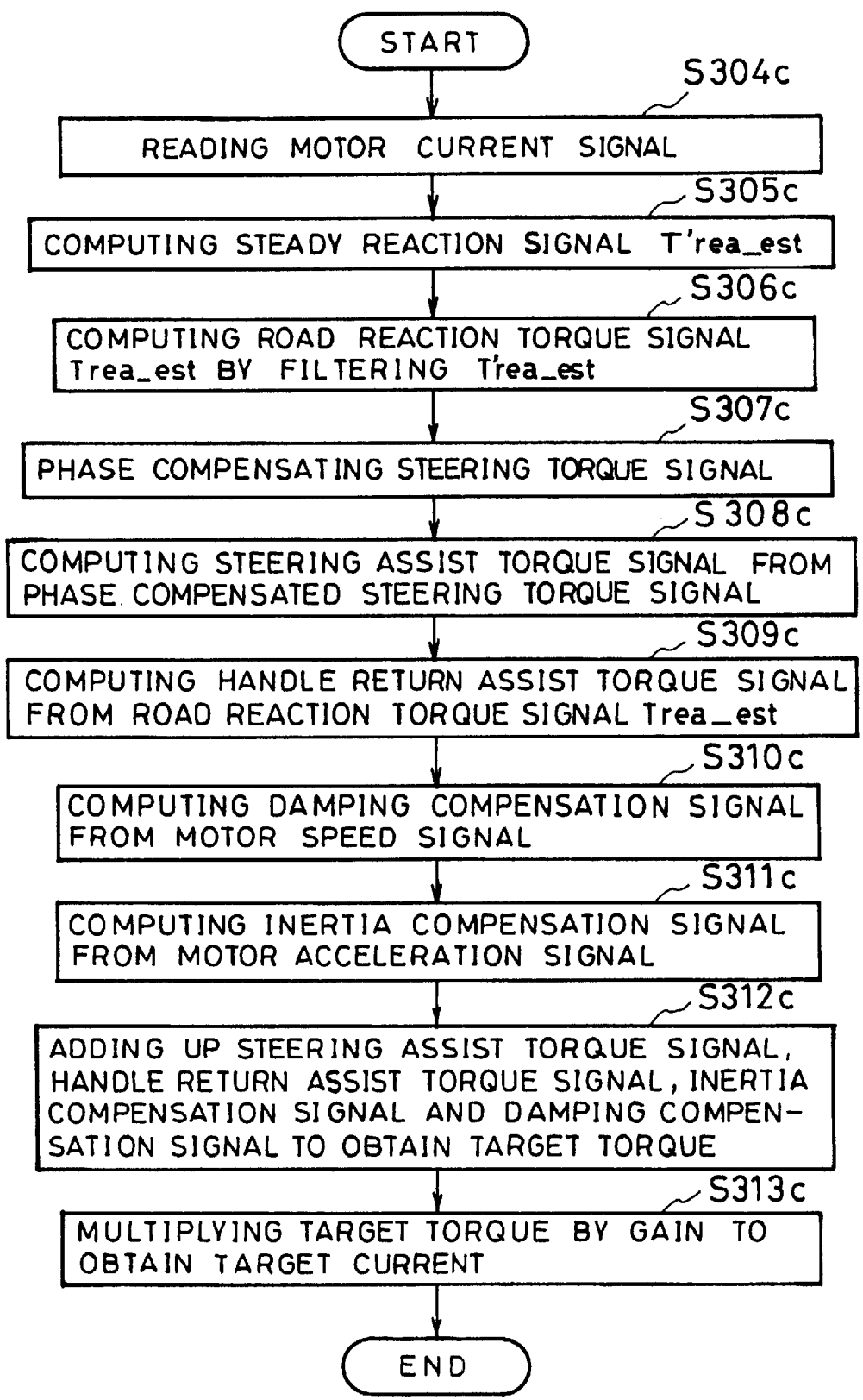
FIG. 13 is a flow chart for explaining the operation of the electric power steering controller according to Embodiment 6 of the present invention.

A description is subsequently given of the operation of the electric power steering controller of Embodiment 6 with reference to the flow chart of FIG. 13.

In step S304c, a motor current signal $I_{mtr}$ is read and stored in the memory. In the following step S305c, a steady reaction signal $T'_{rea\_est}$ is obtained from the above motor current signal $I_{mtr}$ using the following equation (7).

$$T'_{rea\_est}=K_{it} \cdot I_{mtr}+K_i \cdot I_{mtr}-J \cdot d\omega \qquad (7)$$

wherein $K_{it}$ is a conversion constant for converting a motor current signal into a value corresponding to a steering torque signal.

That is, since the output of the steering torque detector 1 is substantially proportional to the output of the motor current detector 11, the steady reaction signal $T'_{rea\_est}$ is computed using a proportional term $K_{it} \cdot I_{mtr}$ in place of the steering torque signal $T_{sens}$.

In step S306c, a road reaction torque signal $T_{rea\_est}$ is obtained by making the primary filter computation of the equation (2) for Embodiment 3 on the steady reaction signal $T'_{rea\_est}$ obtained using the above equation (7) and stored in the memory. Since the subsequent steps S307c to S313c are the same as the steps S307 to S313 of FIG. 7 of the above Embodiment 3, their descriptions are omitted.

Thus, as the road reaction torque can be detected without using the output of the steering torque detector 1, making use of the fact that the output of the steering torque detector 1 is substantially proportional to the output of the motor current detector 11 in this Embodiment 6, the capacity of the memory can be saved and the constitution and arithmetic processing of an arithmetic processing program can be simplified.

Since a motor inertia torque term (–J·dω) may be ignored for an electric power steering controller in which motor inertia torque is smaller than a road reaction torque detection value, such as an electric power steering controller equipped with a small-sized motor or brushless motor, the road reaction torque $T_{rea\_est}$ can be detected only from the output of the motor current detector 11.

Embodiment 7

Figure 14:
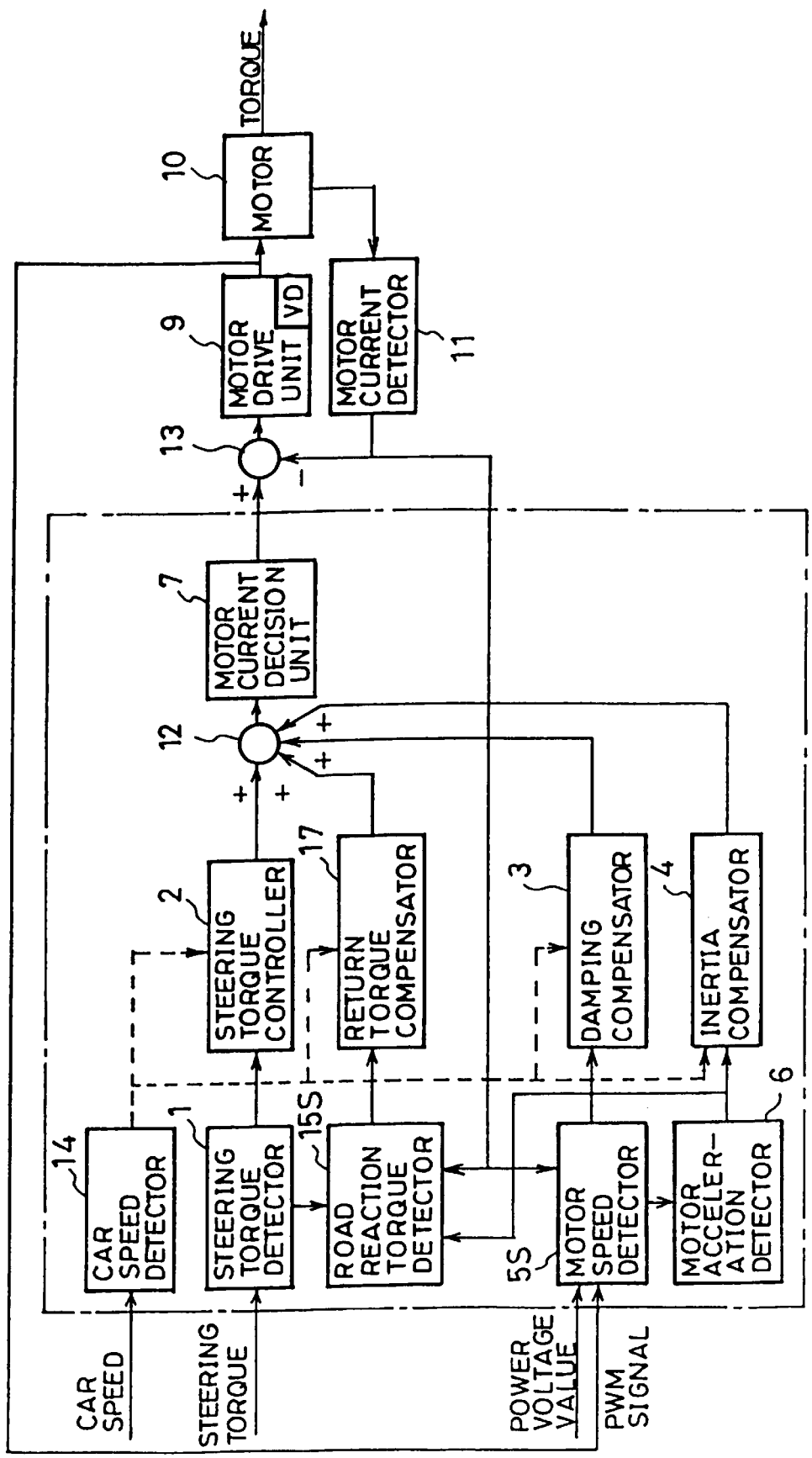
FIG. 14 is a block diagram showing an electric power steering controller according to Embodiment 7 of the present invention.

In Embodiment 3, motor speed is detected by the motor speed detector 5 for detecting the revolution speed of the motor 10 from the output of a sensor such as a motor rotation angle sensor or a motor rotation angle speed sensor. In this Embodiment 7, as shown in FIG. 14, an electric power steering controller is constructed using a motor speed detector 5S which detects a motor rotation angle speed w from a motor current signal $I_{mtr}$ from the motor current detector 11 and a target value of motor application voltage computed from a power voltage value from a power voltage detector VD of the motor drive unit 9 and the duty ratio signal of a PWM signal which is the output of the motor drive unit 9 and is constructed with the software of a microcomputer. The road reaction torque $T_{rea\_est}$ is obtained from an output signal dω obtained by differentiating the above motor rotation angle speed ω, steering torque signal $T_{sens}$, and motor current signal $I_{mtr}$.

Thereby, a sensor such as a motor rotation angle sensor or a motor rotation angle speed sensor becomes unnecessary for the detection of the rotation angle acceleration dω of the motor, thereby making it possible to reduce the cost of the electric power steering controller.

Figure 15:
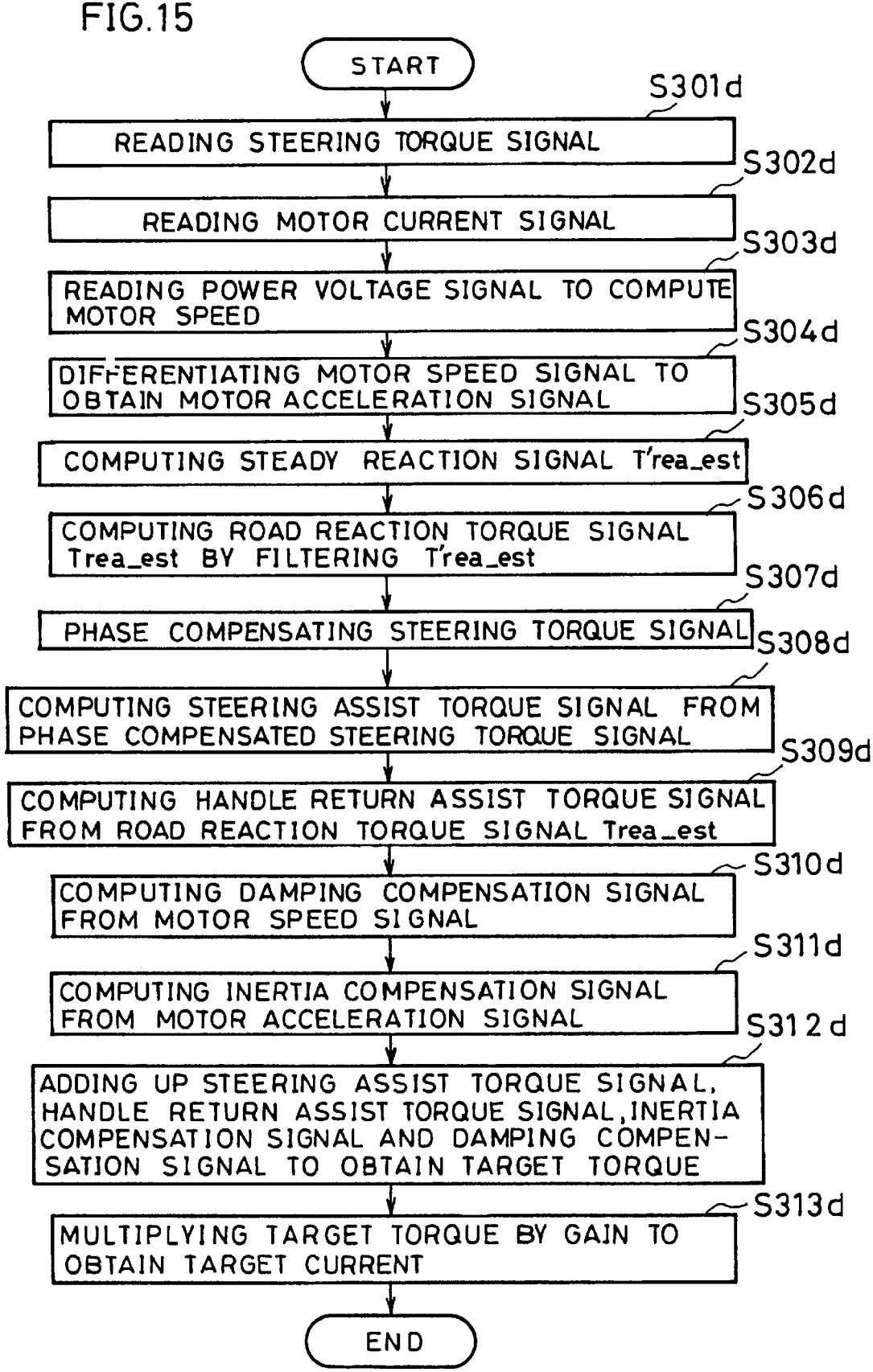
FIG. 15 is a flow chart for explaining the operation of the electric power steering controller according to Embodiment 7 of the present invention.

A description is subsequently given of the operation of the electric power steering controller of Embodiment 7 with reference to the flow chart of FIG. 15.

In the first step S301d, a steering torque signal detected by the steering torque detector 1 is read and stored in the memory. In the following step S302d, a motor current signal is read and stored in the memory.

In step S303d, an output signal $V_b$ from the power voltage detector is converted into a digital value, a duty ratio instruction value $X_{duty}$ which is the output signal of the motor drive unit 9 is read from the memory, and a rotation angle speed ω is obtained by subtracting a value obtained by multiplying a motor armature resistance $R_m$ by a motor current signal $I_{mtr}$ from a value obtained by multiplying this duty ratio instruction value $X_{duty}$ by the output signal $V_b$ from the above power voltage detector. The operation expression of the rotation angle speed ω is given below.

$$\omega = X_{duty} \cdot V_b - R_m \cdot I_{mtr} / K_b \qquad (8)$$

wherein $K_b$ is a back electromotive force constant.

In the subsequent step S304d, a motor acceleration signal dω is obtained by differentiating the above rotation angle speed ω.

Since the subsequent steps S305d to S313d are the same as the steps S305 to S313 of FIG. 7 of Embodiment 3, their descriptions are omitted.

Embodiment 8

Figure 16:
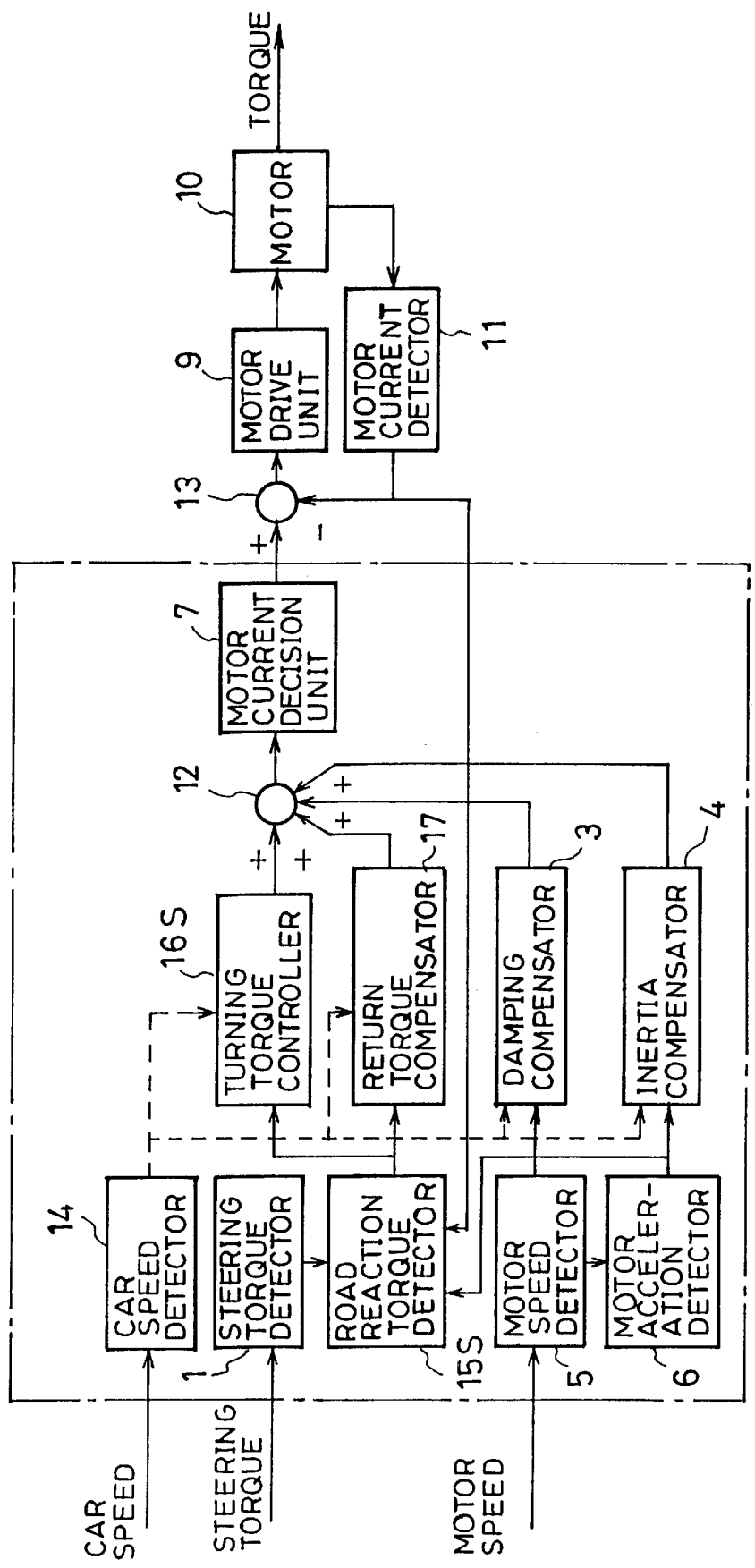
FIG. 16 is a block diagram showing an electric power steering controller according to Embodiment 8 of the present invention.

In Embodiment 3, a road reaction torque signal $T_{rea\_est}$ is detected from a steering torque signal $T_{sens}$, motor acceleration signal do and motor current signal $I_{mtr}$, and an assist torque signal is directly computed from the steering torque detector 1 by the steering torque controller 2. As shown in FIG. 16, a turning torque controller 16S for computing a turning torque signal for causing the motor 10 to generate torque in a direction opposite to road reaction torque based on a road reaction torque signal $T_{rea\_est}$ from the road reaction torque detector 15S equipped with a low-pass filter and outputting it is provided in place of the above steering torque controller 2 to generate an assist torque signal. Thereby, steering torque can be detected with high accuracy even when the inexpensive steering torque detector 1 whose output value includes a large noise component caused by the vibration of an engine or the like is used.

Figure 17:
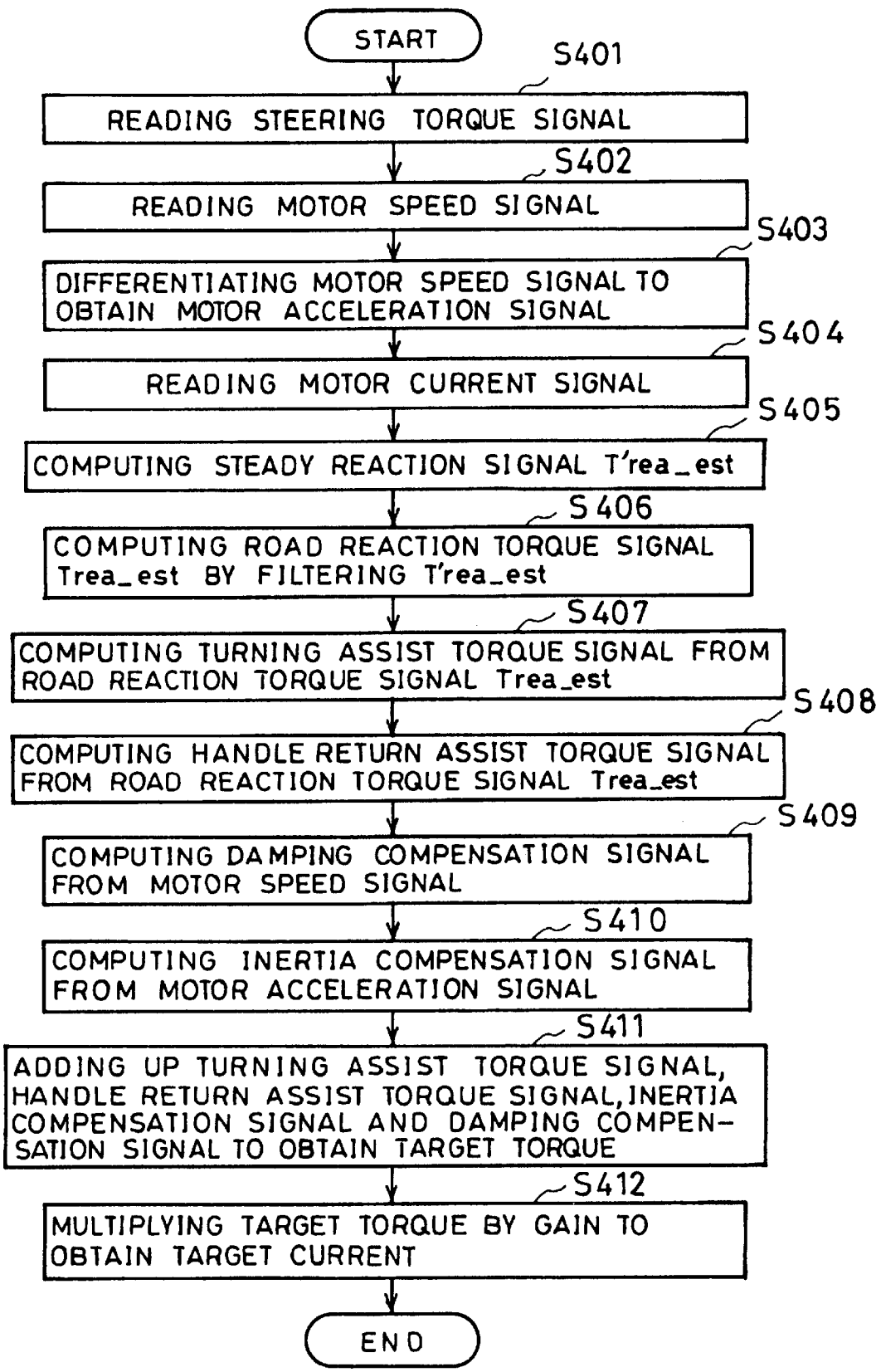
FIG. 17 is a flow chart for explaining the operation of the electric power steering controller according to Embodiment 8 of the present invention.

A description is subsequently given of the operation of the electric power steering controller of this Embodiment 8 with reference to the flow chart of FIG. 17. Since steps S401 (reading a steering torque signal) to S406 (computing a road reaction torque signal $T_{rea\_est}$) are the same as the steps S301 to S306 of the flow chart of FIG. 7, their descriptions are omitted.

In step S407, the turning torque controller 16S makes a map computation on the road reaction torque signal $T_{rea\_est}$ computed in the step S406 to obtain a turning assist torque signal and stores it in the memory. At this point, the map is predetermined such that the turning assist torque signal causes the motor 10 to generate torque in a direction opposite to the direction of road reaction. In the subsequent step S408, the return torque compensator 17 makes a map computation on the road reaction torque signal $T_{rea\_est}$ to obtain a handle return assist torque signal and stores it in the memory.

In step S409, the damping compensator 3 multiplies a motor speed signal by a proportional gain to obtain a damping compensation signal and stores it in the memory. In step S410, the inertia compensator 4 multiplies a motor acceleration signal by a proportional gain to obtain an inertia compensation signal and stores it in the memory. The routine proceeds to step S411 in which the first adder 12 adds up the turning assist torque signal, handle return assist torque signal, damping compensation signal and inertia compensation signal obtained in the steps S407 to S410 to obtain target torque and stores it in the memory. Thereafter, in step S412, the motor current decision unit 7 multiplies the target torque obtained in the above step S411 by a gain to obtain a target current and stores it in the memory.

Embodiment 9

Embodiment 9 is an invention relating to the road reaction torque detector 15S used in Embodiments 3 to 8. Other constituent elements are the same as those of any one of the above Embodiments 3 to 8.

Figure 18:
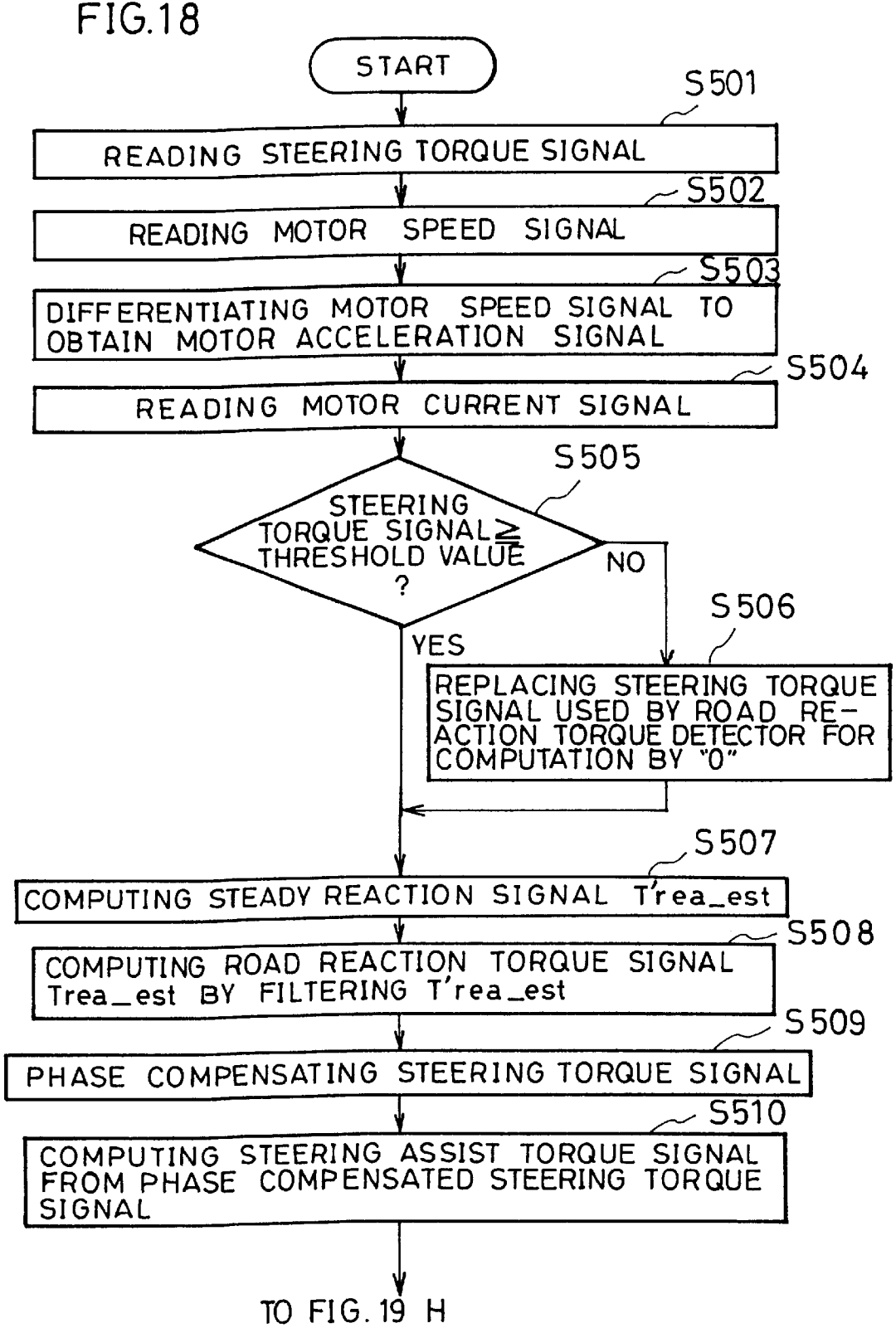
FIG. 18 is a flow chart for explaining the operation of the electric power steering controller according to Embodiment 9 of the present invention.
Figure 19:
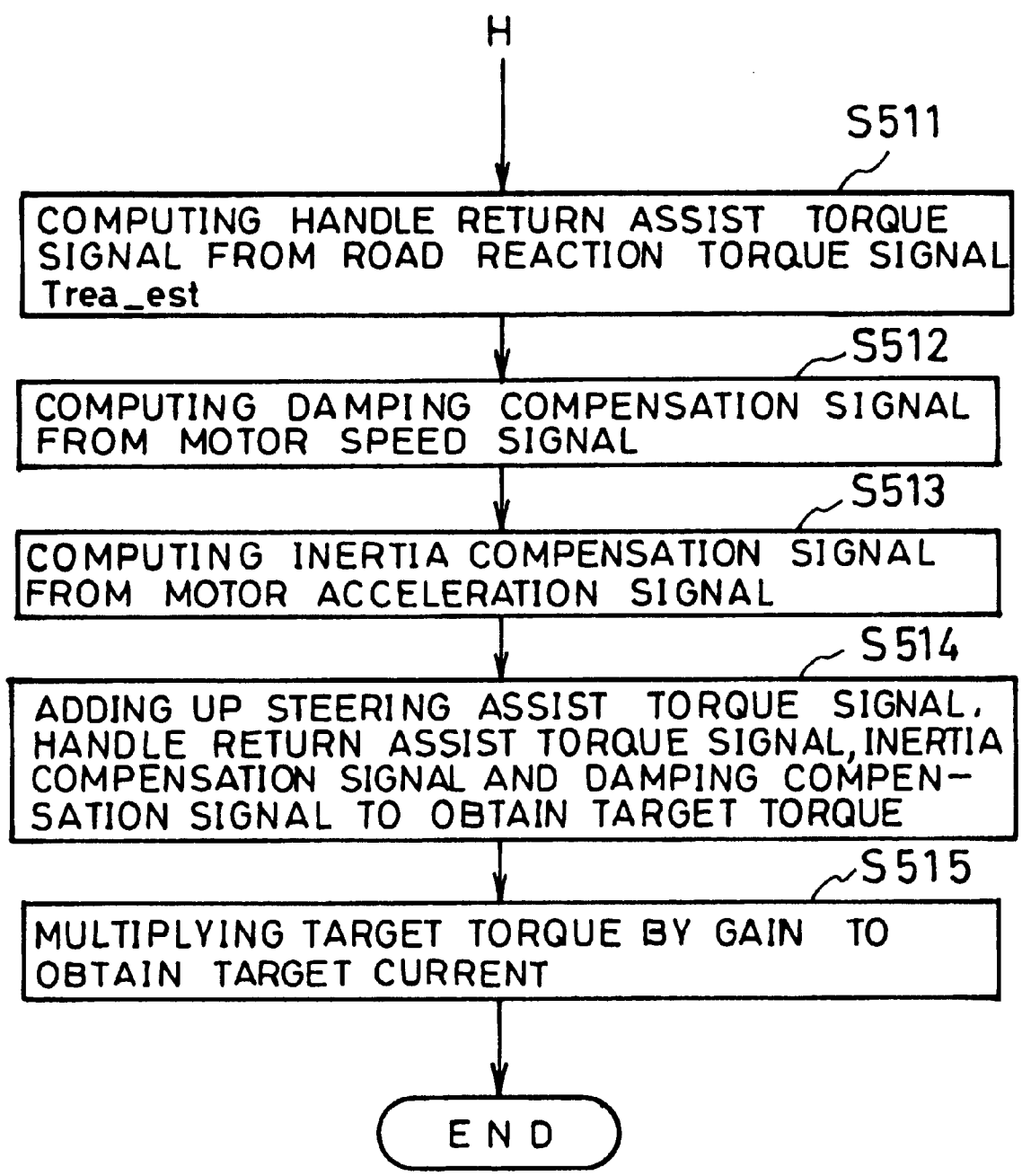
FIG. 19 is a flow chart for explaining the operation of the electric power steering controller according to Embodiment 9 of the present invention.

A description is subsequently given of the operation of the electric power steering controller of Embodiment 9 with reference to the flow chart of FIG. 6 (block diagram of Embodiment 3) and the flow charts of FIG. 18 and FIG. 19.

In the first step S501, a steering torque signal detected by the steering torque detector 1 is read and stored in the memory. In the subsequent step S502, a motor speed signal detected by the motor speed detector 5 is read and stored in the memory. In step S503, the motor acceleration detector 6 differentiates the motor speed signal to obtain a motor acceleration signal and stores it in the memory. In step S504, a motor current signal is read and stored in the memory.

Steps S505 to S508 show the operation of the road reaction torque detector 15S. In step S505, it is judged whether the absolute value of steering torque signal is equal to or larger than a predetermined threshold value. At this point, the above threshold value is preset to a value approximate to the sum of torque required for holding the steering wheel at the time of straight-line driving and the measurement offset of the steering torque detector 1 and stored in a ROM.

When it is judged that the absolute value of steering torque signal is equal to or larger than the threshold value in the step S505, the routine proceeds to step S507 directly and when it is judged that the absolute value is smaller than the threshold value, the routine proceeds to step S506 in which the steering torque signal $T_{sens}$ used by the road reaction torque detector 15S for computation is replaced by "0" and then to step S507.

Like the steps S305 to S313 of Embodiment 3, a road reaction torque signal $T_{rea\_est}$ is computed from the steering torque signal $T_{sens}$, motor acceleration signal do and motor current signal $I_{mtr}$, and a steering assist torque signal and a handle return assist torque signal are obtained from a signal obtained by correcting the phase of the road reaction torque signal $T_{rea\_est}$ in steps S507 to S511

In the subsequent steps S512 to S515, a damping compensation signal and an inertia compensation signal are obtained, the above steering assist torque signal, handle return assist torque signal, damping compensation signal and inertia compensation signal are added up to obtain target torque, and the target torque is then multiplied by a gain to obtain a target current.

The operation of the steps S501 to S515 is repeated.

When the steering torque signal $T_{sens}$ is replaced by "0", the value of road reaction torque signal $T_{rea\_est}$ obtained in the step S508 is approximate to "0". Therefore, if the absolute value of steering torque signal is smaller than the threshold value, control is carried out based on the condition that road reaction torque does not function.

Generally speaking, a road is crowned such that its center portion becomes higher than its edge portions to drain rainwater toward the edge portions. Therefore, when driving straight on the road, it is necessary to hold the steering wheel with small torque. The steering torque detector 1 for detecting steering torque is often offset by a voltage drift or the like. When a steering torque detection signal is directly used, the road reaction torque detection value does not become "0" even at the time of straight-line driving. Therefore, if the road reaction torque detector 15S computes a handle return assist torque signal based on this road reaction torque detection value, the driver may feel unnecessary torque even at the time of straight-line driving.

In contrast to this, in this Embodiment 9, when it is judged that the absolute value of steering torque signal is smaller than the predetermined threshold value, the steering torque signal $T_{sens}$ used by the road reaction torque detector 15 for computation is replaced by "0", the detection value of the road reaction torque detector 15S is substantially set to "0" by computing the steady reaction signal $T_{rea\_est}$ of the equation (1) shown in Embodiment 3, and the threshold value at this point is preset to a value approximate to the sum of torque required for holding the steering wheel at the time of straight-line driving and the measurement offset of the steering torque detector. Therefore, the above-described problem can be solved.

Figure 20:
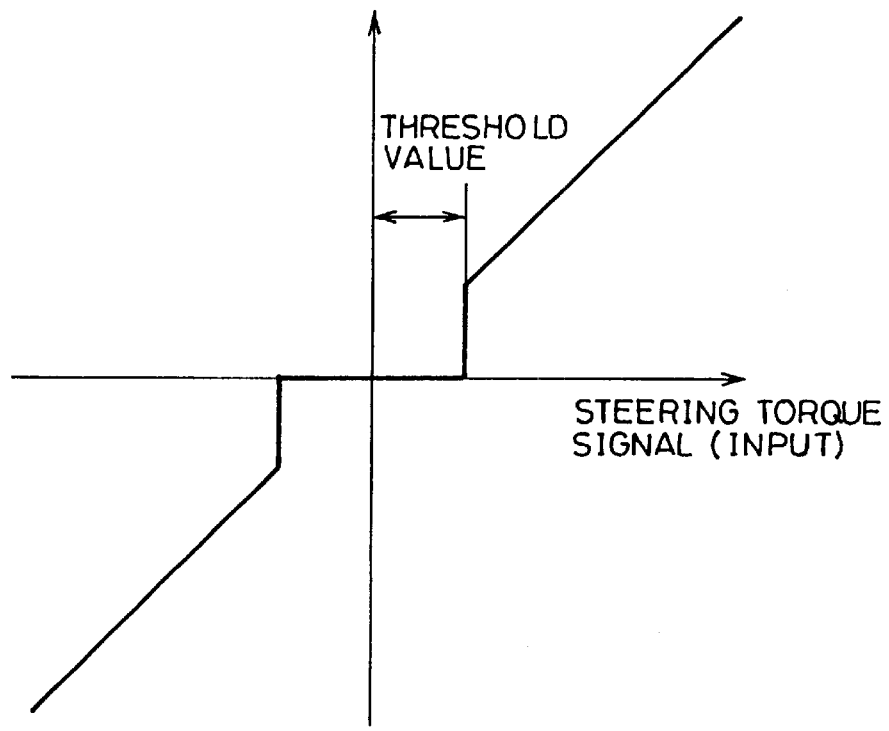
FIG. 20 is a diagram showing the characteristics of the dead zone of a road reaction torque detector.
Figure 21:
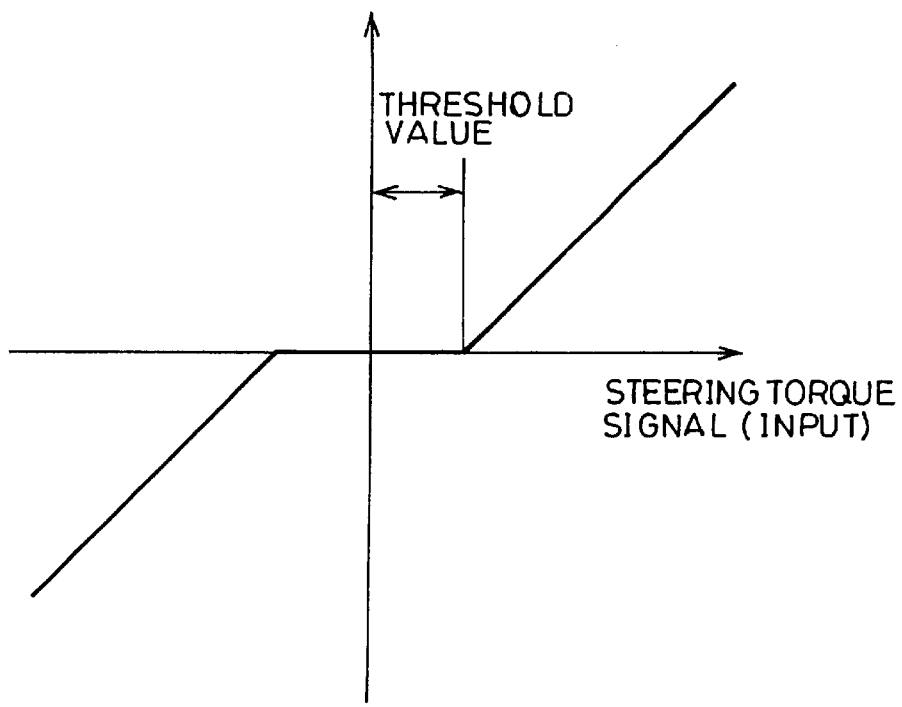
FIG. 21 is a diagram showing the characteristics of the dead zone of another road reaction torque detector.

In Embodiment 9, when it is judged in the step S505 that the absolute value of steering torque signal is smaller than the threshold value, the steering torque signal $T_{sens}$ used by the road reaction torque detector 1 for computation is replaced by "0". Therefore, the relationship between the steering torque signal applied to the road reaction torque detector 15S and the steering torque signal used by the road reaction torque detector 15S for computation becomes discontinuous as shown in FIG. 20. However, as shown in FIG. 21, it may be set without discontinuous points. That is, when it is judged in the step S505 that the absolute value of steering torque signal is equal to or larger than the threshold value, the routine may proceed to step S507 to eliminate the discontinuous points after the threshold value is subtracted from the steering torque signal $T_{sens}$.

Embodiment 10

Figure 22:
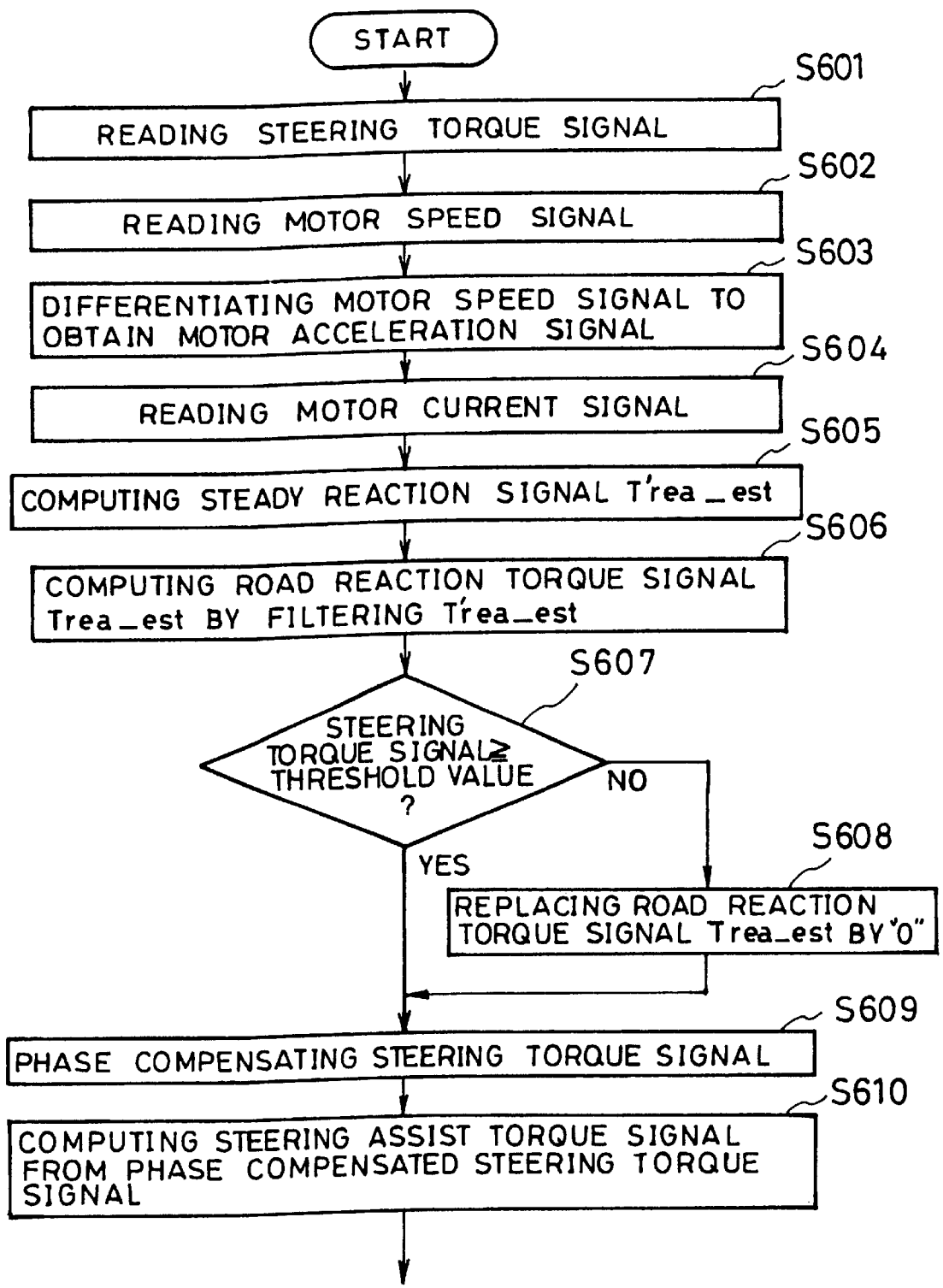
FIG. 22 is a flow chart for explaining the operation of an electric power steering controller according to Embodiment 10 of the present invention.
Figure 23:
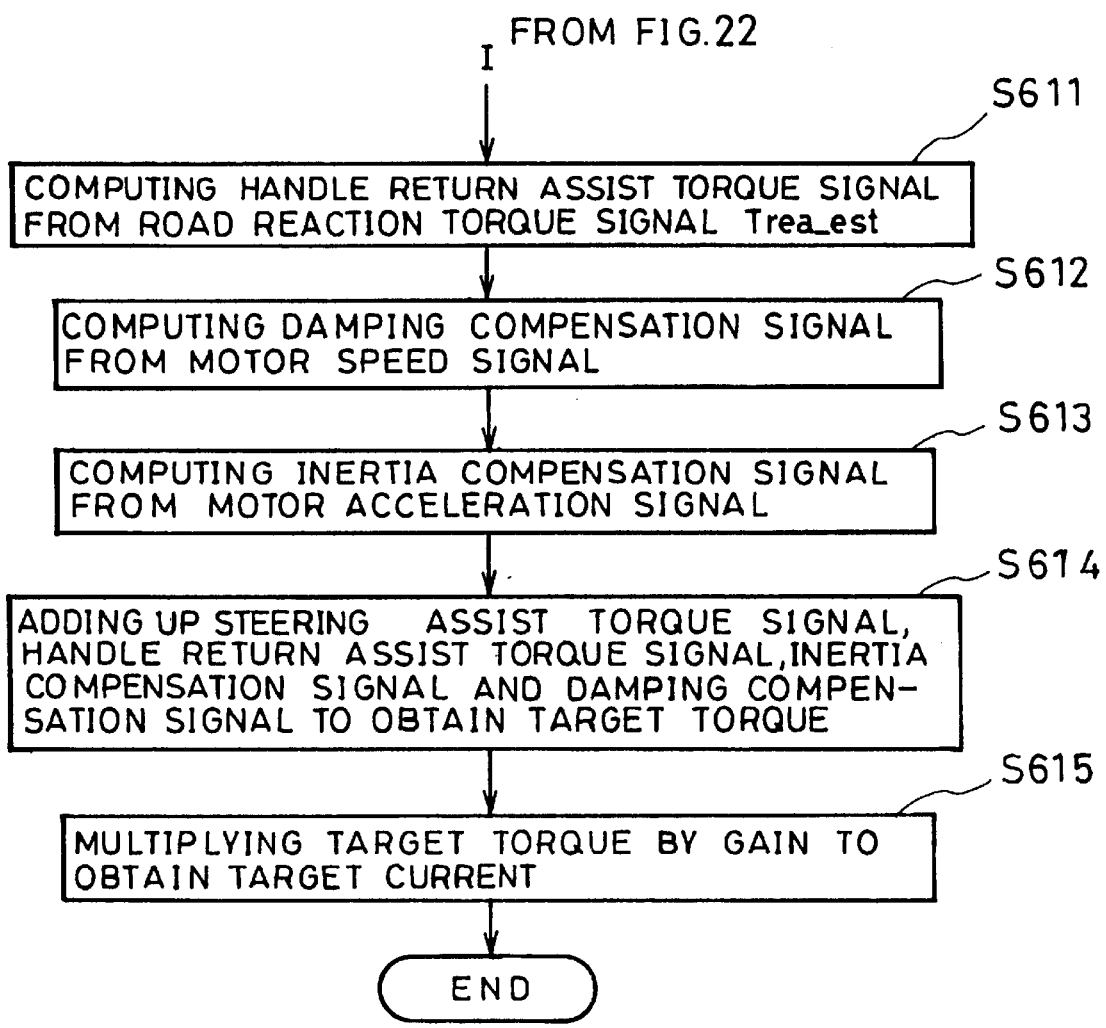
FIG. 23 is a flow chart for explaining the operation of an electric power steering controller according to Embodiment 10 of the present invention.

In Embodiment 9, after it is judged whether the absolute value of steering torque signal is equal to or larger than the predetermined threshold value, the computation of a steady reaction signal $T_{rea\_est}$ and the computation of a road reaction torque signal $T_{rea\_est}$ are carried out. As shown in the flow charts of FIG. 22 and FIG. 23, it may be judged whether the absolute value of steering torque signal is equal to or larger than the predetermined threshold value (step S607) after the computation of the steady reaction signal $T_{rea\_est}$ (step S605) and the computation of the road reaction torque signal $T_{rea\_est}$ (step S606) are carried out. In this case, the same effect as that of Embodiment 9 can be obtained.

In this Embodiment 10, when it is judged in the above step S607 that the absolute value of steering torque signal is smaller than the threshold value, the road reaction torque signal $T_{rea\_est}$ is replaced by "0" in step S608 and then a handle return assist torque signal is obtained (step S611).

Embodiment 11

In Embodiments 9 and 10, when the road reaction torque detector 15S which is constructed with the software of a microcomputer judges that the absolute value of input steering torque signal is smaller than the predetermined threshold value, the steering torque signal $T_{sens}$ or road reaction torque signal $T_{reaest}$ used by the road reaction torque detector 15S for computation is replaced by "0" to obtain a handle return assist torque signal. A threshold value may also be set for the road reaction torque signal in the road reaction torque detector 15 used in Embodiments 1 and 2. When the road reaction torque signal is smaller than the threshold value, the road reaction torque signal $T_{rea\_est}$ is replaced by "0" and then a turning assist torque signal and a handle return assist torque signal are computed. Further, the threshold value at this point is preset to a value approximate to the offset of the output of the road reaction torque detector at the time of straight-line driving. Therefore, the generation of unrequired torque can be thereby eliminated at the time of straight-line driving like Embodiments 9 and 10, thereby making it possible to improve steerability.

Figure 24:
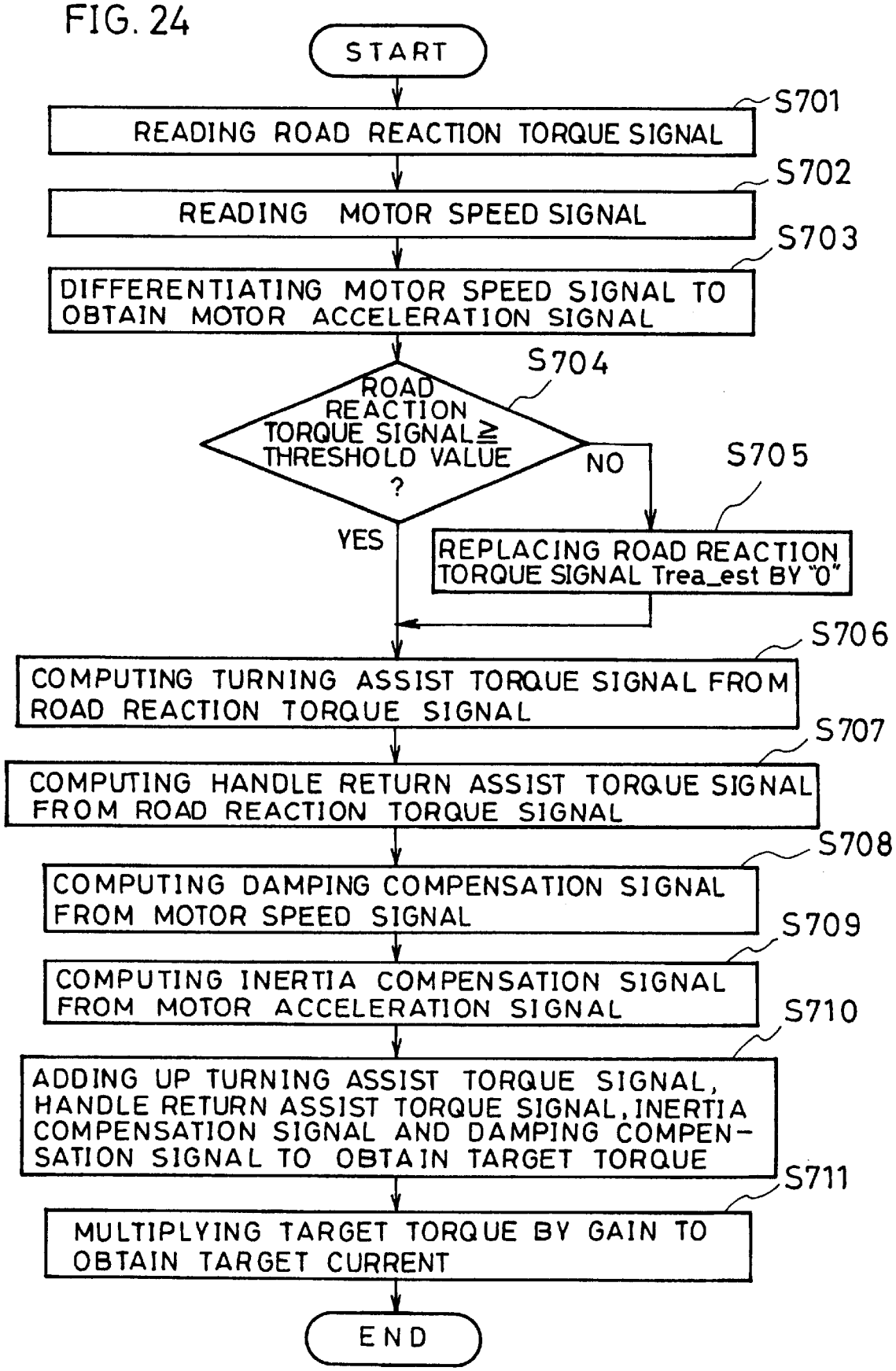
FIG. 24 is a flow chart for explaining the operation of an electric power steering controller according to Embodiment 11 of the present invention.

A description is subsequently given of the operation of electric power steering controller with reference to the flow chart of FIG. 24.

In the first step S701, a road reaction torque signal detected by the road reaction torque detector 15 is read and stored in the memory. In the following step S702, a motor speed signal detected by the motor speed detector 5 is read and stored in the memory. In step S703, the motor acceleration detector 6 differentiates the motor speed signal to obtain a motor acceleration signal and stores it in the memory.

In the subsequent step S704, it is judged whether the absolute value of road reaction torque signal is equal to or larger than the predetermined threshold value. When it is judged that the absolute value of road reaction torque signal is equal to or larger than the threshold value, the routine proceeds to step S706 directly and when it is judged that the absolute value is smaller than the threshold value, the routine proceeds to step S705 to replace the road reaction torque signal $T_{rea\_est}$ by "0" and then to step S706.

In the step S706, the turning torque controller 16 makes a map computation on the road reaction torque signal to obtain a turning assist torque signal. In step S707, the return torque compensator 17 makes a map computation on the road reaction torque signal to obtain a handle return assist torque signal.

In the subsequent step S708, the damping compensator 3 multiplies the motor speed signal by a proportional gain to obtain a damping compensation signal and stores it in the memory. In step S709, the inertia compensator 4 multiplies the motor acceleration signal by a proportional gain to obtain an inertia compensation signal and stores it in the memory.

The routine then proceeds to step S710 in which the first adder 12 adds up the turning assist torque signal, handle return assist torque signal, damping compensation signal and inertia compensation signal obtained in the steps S706 to S709 to obtain target torque and stores it in the memory. In the subsequent step S711, the motor current decision unit 7 multiplies the target torque obtained in the above step S711 by a gain to obtain a target current and stores it in the memory.

Embodiment 12

In this Embodiment 12, the time constant of the low-pass filter provided in the road reaction torque detector 15S of Embodiments 3 to 8 is changed according to car speed, thereby making it possible to improve the returnability of the steering wheel to its starting point regardless of car speed.

Figure 25:
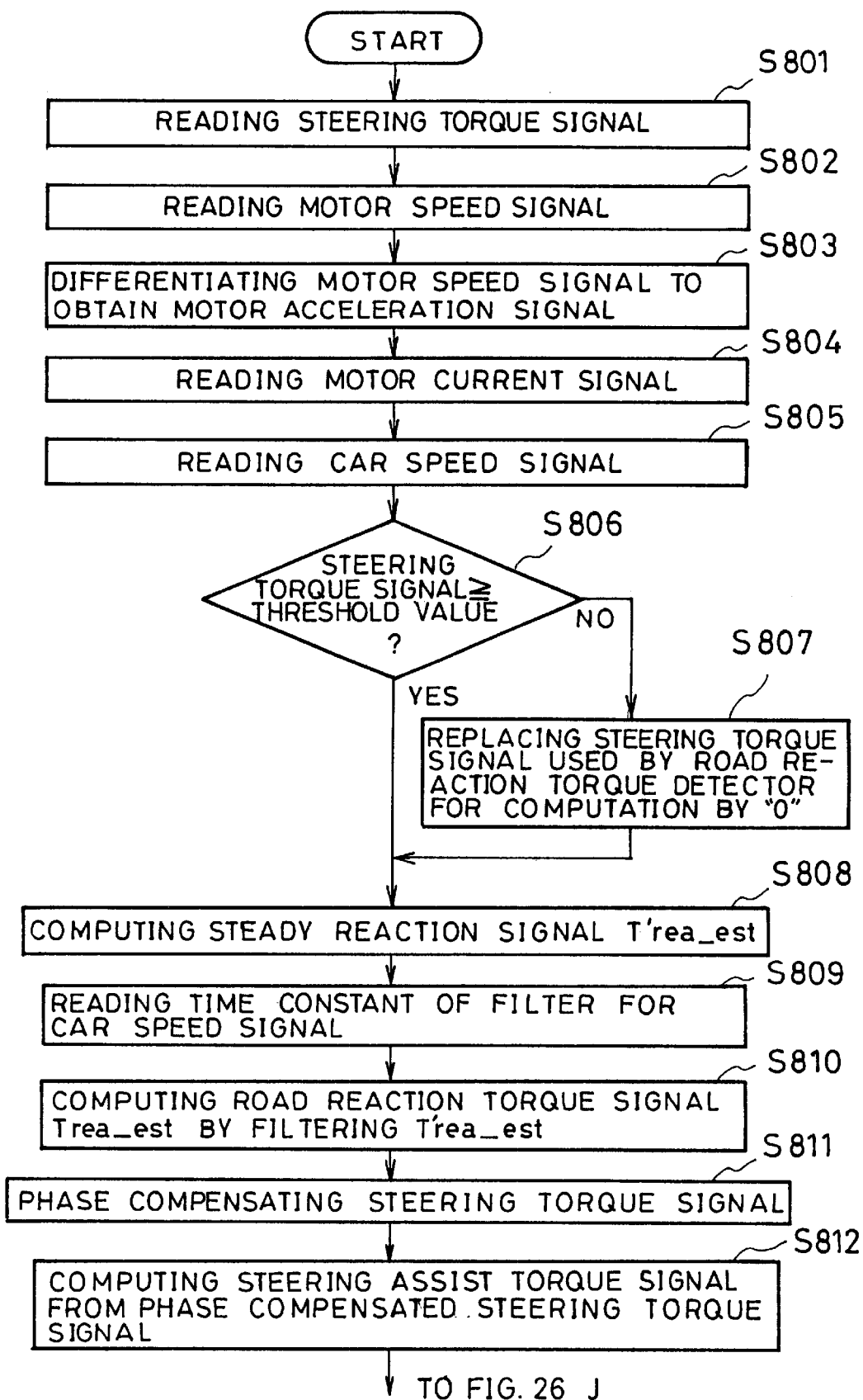
FIG. 25 is a flow chart for explaining the operation of an electric power steering controller according to Embodiment 12 of the present invention.
Figure 26:
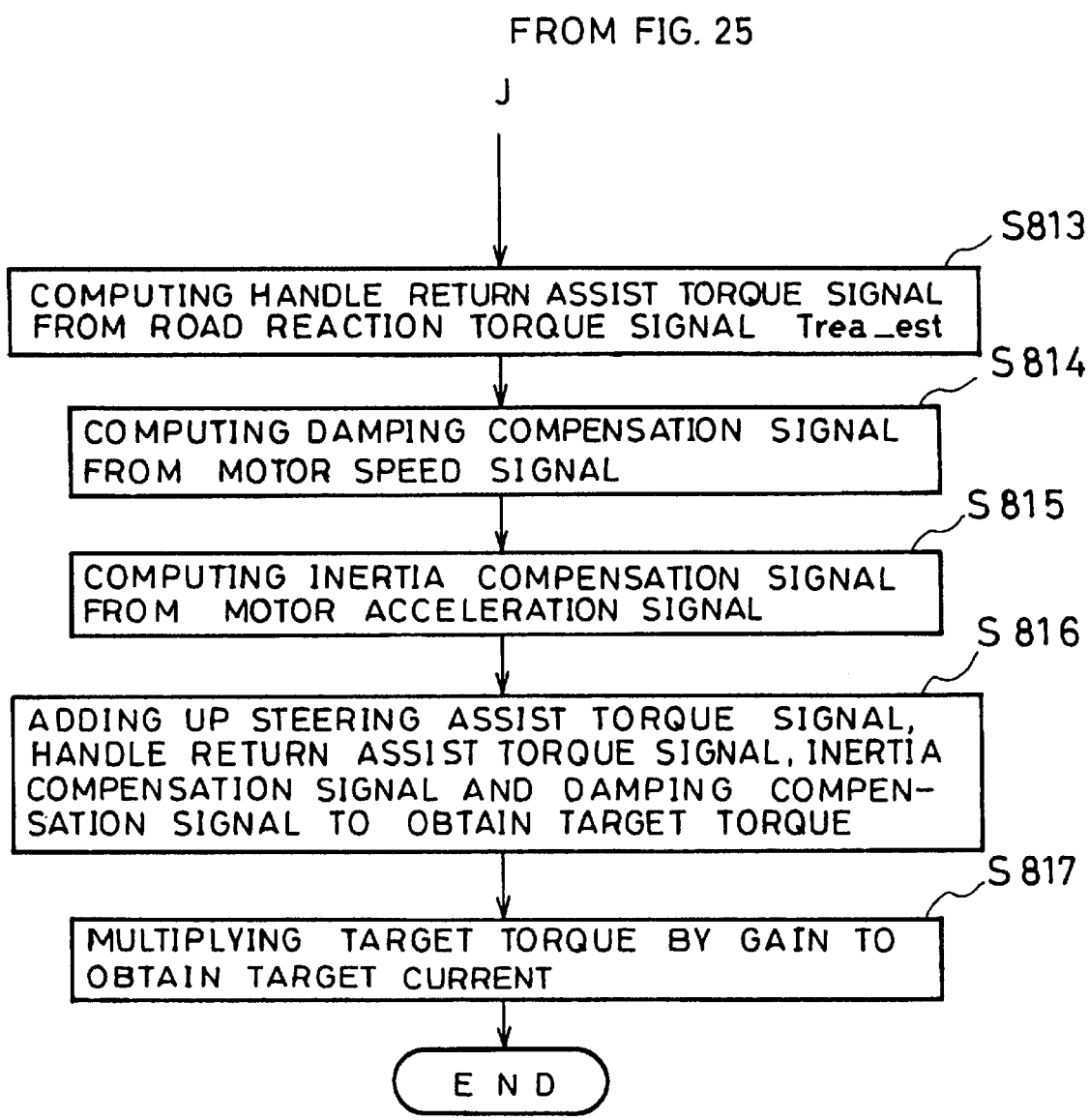
FIG. 26 is a flow chart for explaining the operation of an electric power steering controller according to Embodiment 12 of the present invention.
Figure 27:
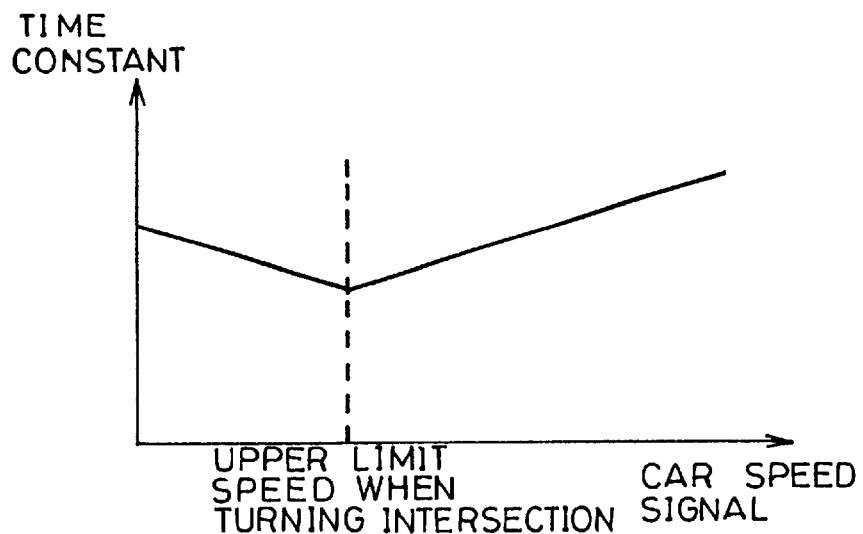
FIG. 27 is a diagram showing the relationship between the time constant of the filter of a road reaction torque detector and car speed.

This Embodiment 12 will be described hereinunder with reference to FIG. 6 (block diagram of Embodiment 3) and the flow charts of FIG. 25 and FIG. 26.

In the first step S801, a steering torque signal detected by the steering torque detector 1 is read and stored in the memory. In the following step S802, a motor speed signal detected by the motor speed detector 5 is read and stored in the memory. In step S803, the motor accelerator detector 6 differentiates the motor speed signal to obtain a motor acceleration signal and stores it in the memory. In step S804, a motor current signal is read and stored in the memory.

In the following step S805, a car speed signal is read and stored in the memory.

In step S806, it is judged whether the absolute value of steering torque signal is equal to or larger than a threshold value. The threshold value at this point is preset to a value approximate to the sum of torque required for holding the steering wheel at the time of straight-line driving and the measurement offset of the steering torque detector 1 and stored in the ROM. When it is judged in the step S806 that the absolute value of steering torque signal is equal to or larger than the threshold value, the routine proceeds to step S808 directly and when it is judged that the absolute value is smaller than the threshold value, the routine proceeds to step S807 in which the steering torque signal $T_{sens}$ used by the road reaction torque detector 15S for computation is replaced by "0" and then to step S808.

In the step S808, a steady reaction signal $T'_{rea\_est}$ is computed by the equation (1) as in embodiment 3.

$$T'_{rea\_est} = T_{sens} + K_t \cdot I_{mtr} - J \cdot d\omega \qquad (1)$$

wherein $K_t$ is the torque constant of the motor (in terms of the steering shaft) and J is the inertia moment of the steering unit.

In step S809, the time constant $T_1$ of the primary filter of the equation (2) is read from a map predetermined for the above car speed signal. In step S810, the computation of the primary filter of the above equation (2) is carried out using the time constant read in the above step S809 to obtain a road reaction torque signal $T_{rea\_est}$ which is then is stored in the memory.

$$dT_{rea\_est}/dt = -T_{rea\_est}/T_1 + T'_{rea\_est}/T_1 \qquad (2)$$

Thereafter, like the step S307 to S313 of the above Embodiment 3, the phase of the steering torque signal is corrected in step S811, a map computation is made on the phase compensated steering torque signal to obtain a steering assist torque signal in step S812, a map computation is made on the road reaction torque signal $T_{rea\_est}$ to obtain a handle return assist torque signal, damping compensation signal and inertia compensation signal, target torque is obtained by adding up the steering assist torque signal, handle return assist torque signal, damping compensation signal and inertia compensation signal, and finally a target current is obtained by multiplying this target torque by a gain in steps S813 to S817.

The operation of the steps S801 to S817 is repeated.

The frequency band of steering by the driver differs according to car speed. Generally speaking, quick steering is carried out at a low car speed and slow steering is carried out at a high car speed to prevent the instable behavior of a vehicle in most cases.

The filter is introduced to represent the friction torque of the steering unit by equivalent gain and phase, and the time constant of the optimal filter differs according to steering frequency. The time constant is set large for low-frequency slow steering and small for high-frequency quick steering to improve the accuracy of a road reaction torque signal for the actual road reaction torque. When the accuracy of the road reaction torque signal is high, if steering for the change of the lane is carried out, a handle return assist torque signal corresponding to the actual road reaction can be obtained, thereby making it possible to provide a better steering feeling to the driver.

Since the road reaction torque signal $T_{rea\_est}$ when the driver releases his/her hands from the steering wheel decreases gradually as the time constant becomes larger, the handle return assist torque signal is output for a long time. Therefore, when it takes long to return the steering wheel to its starting point, for example, when the driver releases his/her hands from the steering wheel after turning the steering wheel greatly at an intersection, the returnability of the steering wheel can be improved with a large time constant. Generally speaking, the car speed is limited to a low speed when the steering wheel is turned greatly at an intersection or the like, and the steering wheel is controlled relatively slightly for changing the lane or the like at a car speed range higher than that.

Therefore, when the time constant $T_1$ of the primary filter of the equation (2) is set such that it becomes smaller as the car speed increases up to the upper limit value when the driver turns the steering wheel at an intersection or the like and larger as the car speed increases to a value higher than the above upper limit value, the returnability of the steering wheel to its starting point when the driver releases his/her hands from the steering wheel after turning the steering wheel greatly at a low speed, a good steering feeling at a middle or high speed and the returnability of the steering wheel to its starting point when the driver releases his/her hands from the steering wheel after turning the steering wheel slightly can be obtained.

Figure 28:
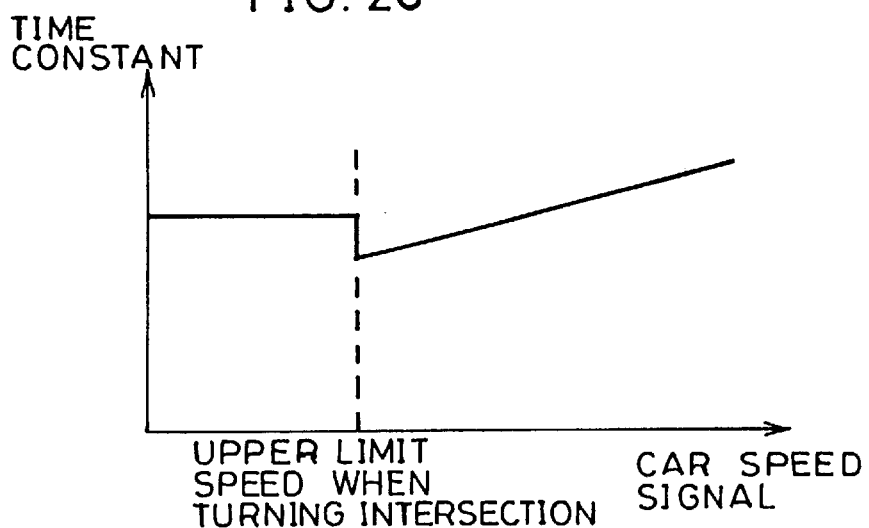
FIG. 28 is a diagram showing the relationship between the time constant of the filter of another road reaction torque detector and car speed.

The above time constant $T_1$ may be fixed at a car speed up to the upper limit value when the driver turns the steering wheel greatly at an intersection or the like as shown in FIG. 28.

Figure 29:
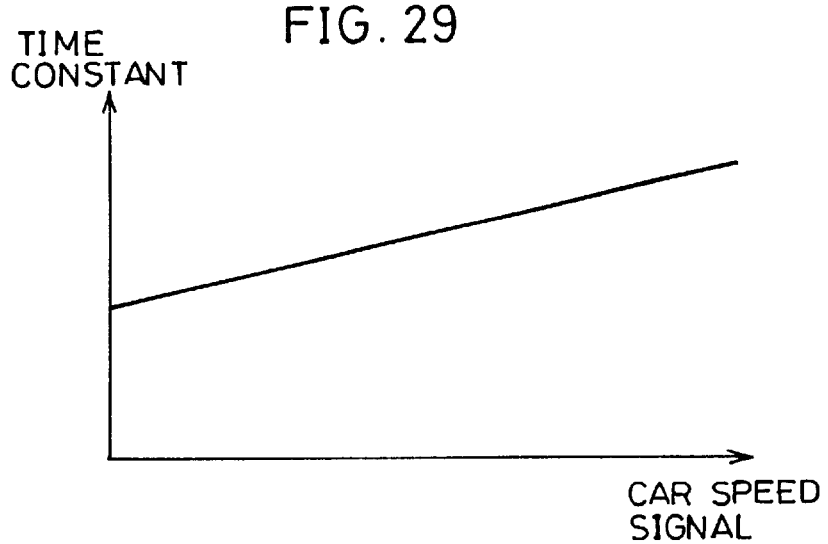
FIG. 29 is a diagram showing the relationship between the time constant of the filter of still another road reaction torque detector and car speed.

Alternatively, to improve only a steering feeling for a vehicle which has the small friction of the steering unit and the relatively high returnability of the steering wheel to its starting point, the above time constant $T_1$ may be set larger as the car speed increases in accordance with a general steering frequency for car speed as shown in FIG. 29.

In this Embodiment 12, since the time constant of the filter which is given equivalent to the friction of the steering unit in the road reaction torque detector 15S is changed according to car speed, the returnability of the steering wheel to its starting point when the driver releases his/her hands from the steering wheel after turning the steering wheel greatly at a low speed, a good steering feeling at a middle or high speed, and the returnability of the steering wheel to its starting point when the driver releases his/her hands from the steering wheel after turning the steering wheel slightly can be obtained.

Embodiment 13

Figure 30:
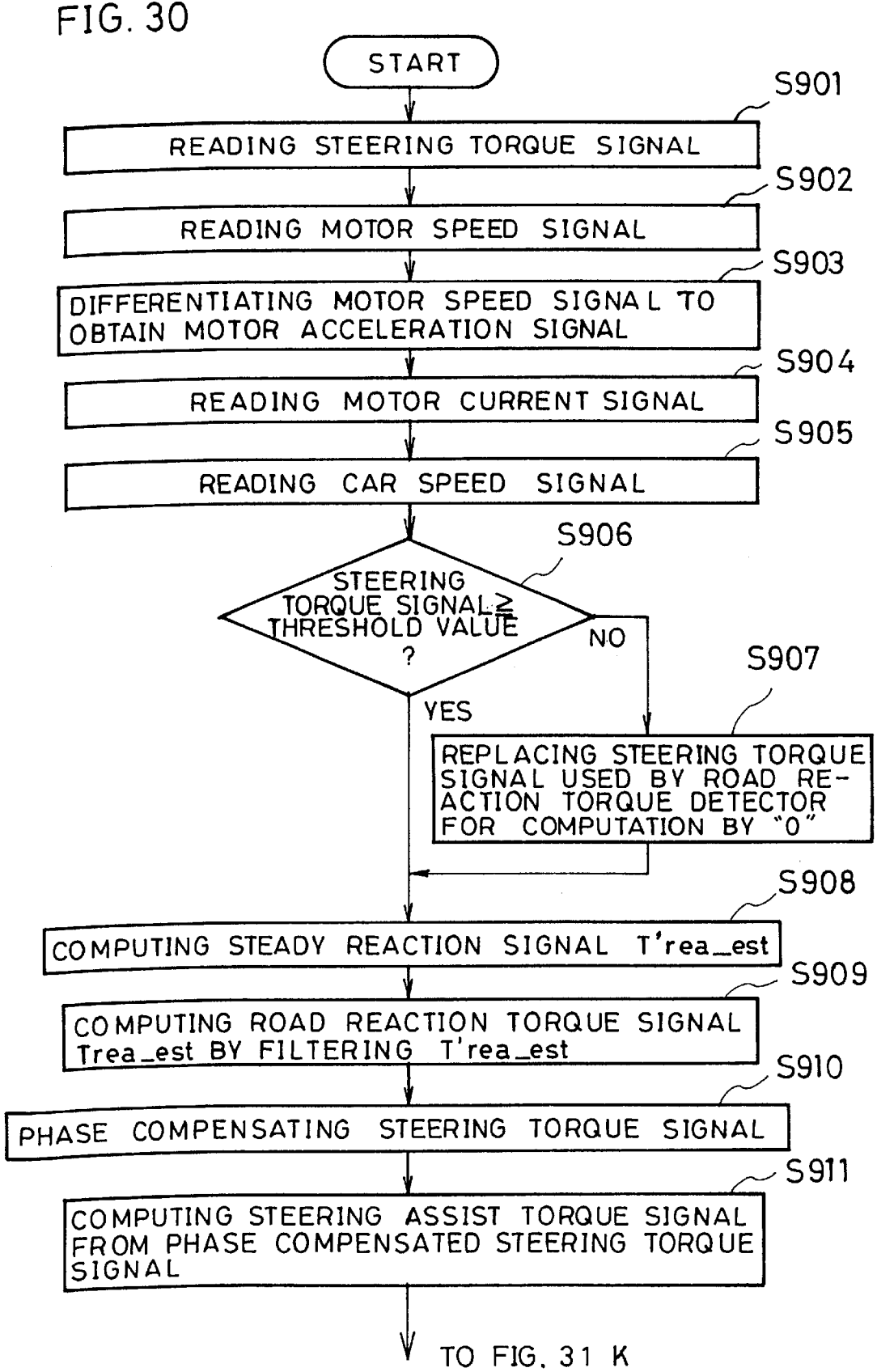
FIG. 30 is a flow chart for explaining the operation of an electric power steering controller according to Embodiment 13 of the present invention.
Figure 31:
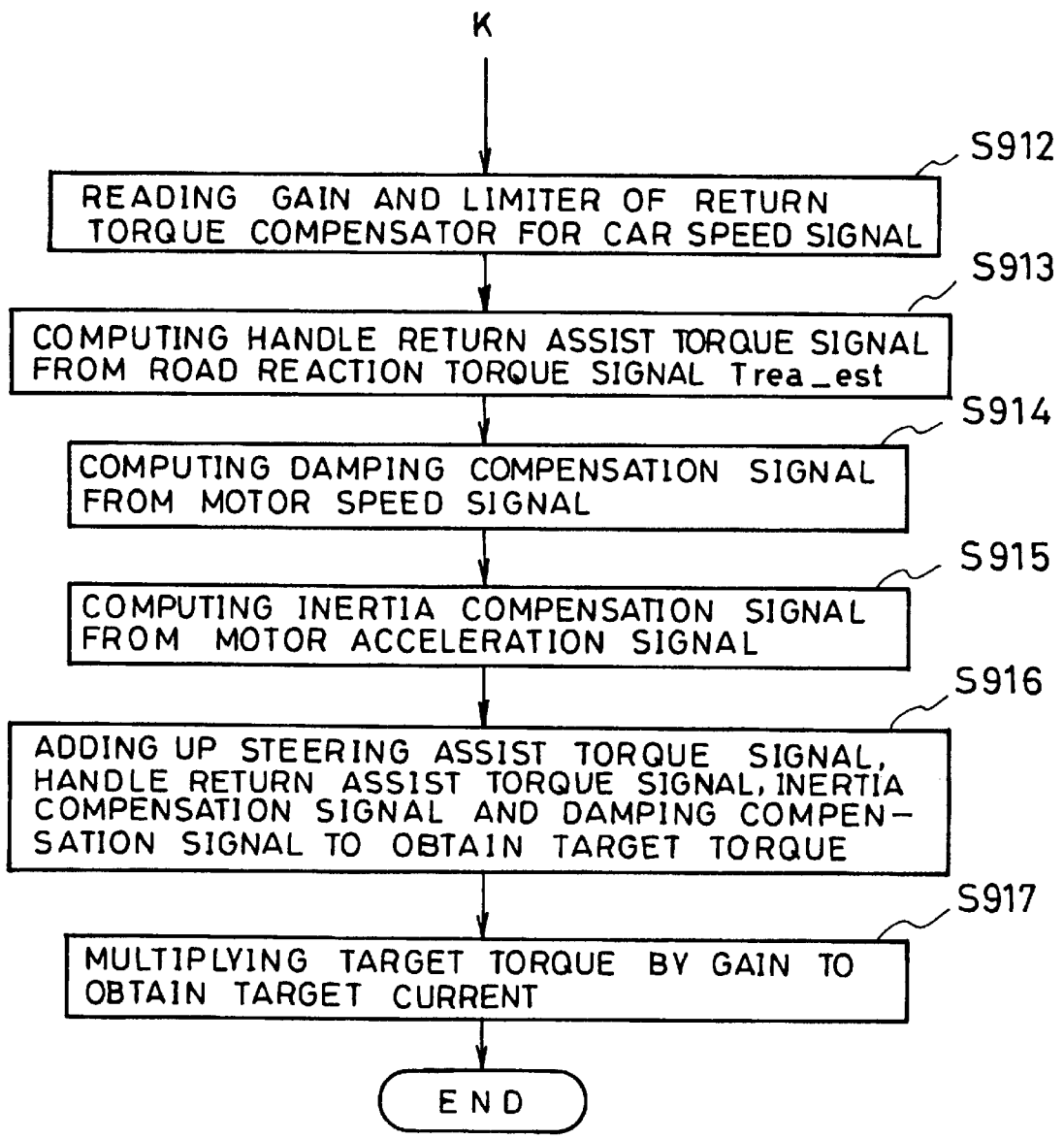
FIG. 31 is a flow chart for explaining the operation of an electric power steering controller according to Embodiment 13 of the present invention.

Embodiment 13 relates to the operation of the return torque compensator 17 for the computation of a handle return assist torque signal from a road reaction torque signal. Other constituent elements are the same as those of any one of Embodiments 1 to 11. This Embodiment 13 will be described hereinunder with reference to the flow charts of FIG. 30 and FIG. 31.

In the first step S901, a steering torque signal detected by the steering torque detector 1 is read and stored in the memory. In the following step S902, a motor speed signal detected by the motor speed detector 5 is read and stored in the memory. In step S903, the motor acceleration detector 6 differentiates the motor speed signal to obtain a motor acceleration signal and stores it in the memory. In step S904, a motor current signal is read and stored in the memory.

In the subsequent step S905, a car speed signal is read and stored in the memory.

In step S906, it is judged whether the absolute value of steering torque signal is equal to or larger than a threshold value. The threshold value at this point is preset to a value approximate to the sum of torque required for holding the steering torque at the time of straight-line driving and the measurement offset of the steering torque detector 1 and stored in the ROM.

When it is judged in the step S906 that the absolute value of steering torque signal is equal to or larger than the threshold value, the routine proceeds to step S908 directly and when it is judged that the absolute value is smaller than the threshold value, the routine proceeds to step S907 in which the steering torque signal $T_{sens}$ used by the road reaction toque detector 15S for computation is replaced by "0", to step S908 to compute a steady reaction signal $T'_{rea\_est}$ and to step S909 to filter the above $T'_{rea\_est}$ to obtain a road reaction torque signal $T_{rea\_est}$.

After the phase of the steering torque signal is corrected in the subsequent step S910, a map computation is made on this phase compensated steering torque signal to obtain a steering assist torque signal in step 911.

Figure 32:
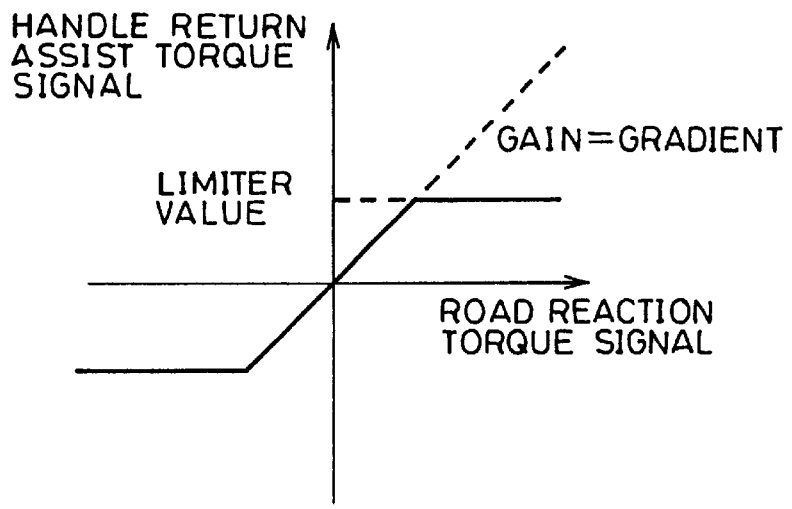
FIG. 32 is a diagram showing the characteristics of a return torque compensator.

Steps S912 and S913 show the operation of the return torque compensator 17 in Embodiment 13. In the step S912, a gain and a limiter predetermined for the car speed read in the above step S905 are read. In the following step S913, a map computation is made on the road reaction torque signal $T_{rea\_est}$ to obtain a handle return assist torque signal which is then stored in the memory. The map at this point corresponds to the gain and limiter read in the step S912 as shown in FIG. 32.

In the subsequent steps S914 to S917, a damping compensation signal and an inertia compensation signal are obtained, target torque is obtained by adding up the steering assist torque signal, handle return assist torque signal, damping compensation signal and inertia compensation signal, and a target current is obtained by multiplying this target torque by a gain.

The operation of steps S901 to S917 is repeated.

Generally speaking, the road reaction torque is the function of car speed and becomes smaller as the car speed lowers when the steering angle is the same, thereby deteriorating the returnability of the steering wheel to its starting point. At an extremely low speed range at the time of parking, the vehicle is moved with the steering wheel kept turned in most cases and straight-line driving is not required. Therefore, the returnability of the steering wheel to its starting point is not important. Consequently, the gain and limiter of the return torque compensator 17 must be set such that a handle return assist torque signal is made small at an extremely low speed range and larger as the car speed decreases after it exceeds a predetermined car speed.

Figure 33:
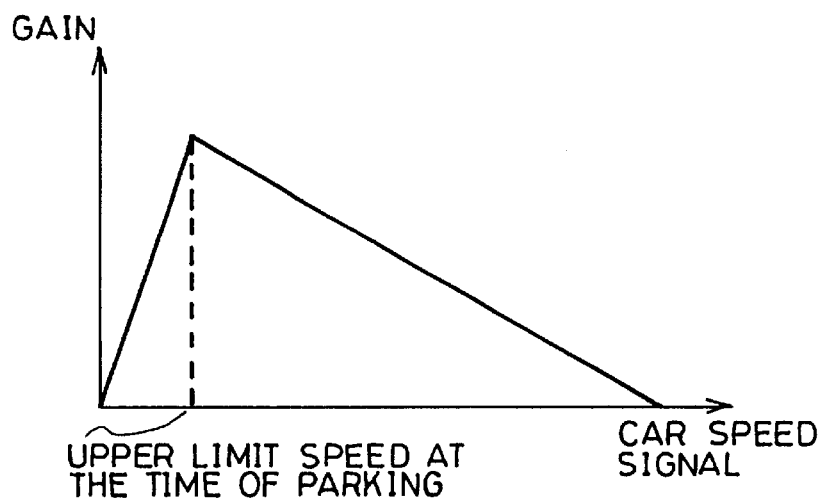
FIG. 33 is a diagram showing the characteristics of the gain of the return torque compensator.
Figure 34:
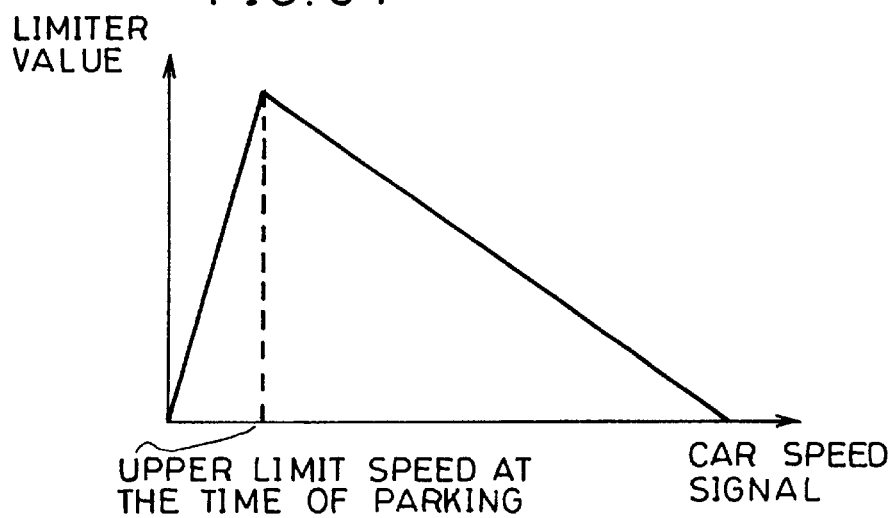
FIG. 34 is a diagram showing the characteristics of the limiter of the return torque compensator.

In this Embodiment 13, in step S912, the gain and limiter of the return torque compensator 17 become the largest when the car speed reaches approximately the upper limit value of general parking speed as shown in FIGS. 33 and 34. At a car speed range below the upper limit value of parking speed, the gain and limiter may be set to "0" so that the handle return assist torque signal becomes "0". Also at a high speed range where the returnability of the steering wheel to its starting point is sufficiently high, the gain and limiter may be set to "0" so that the handle return assist torque signal becomes "0".

Thus, in this Embodiment 13, the gain and limiter of the return torque compensator 17 for the computation of a handle return assist torque signal from a road reaction torque signal become the largest when the car speed reaches approximately the upper limit value of general parking speed, thereby making it possible to improve the returnability of the steering wheel to its starting point regardless of car speed without reducing operation ease at the time of parking.

In Embodiment 13, both the gain and limiter are changed at the same time. Even when only one of them is changed and the other is fixed, the same effect can be expected.

Figure 35:
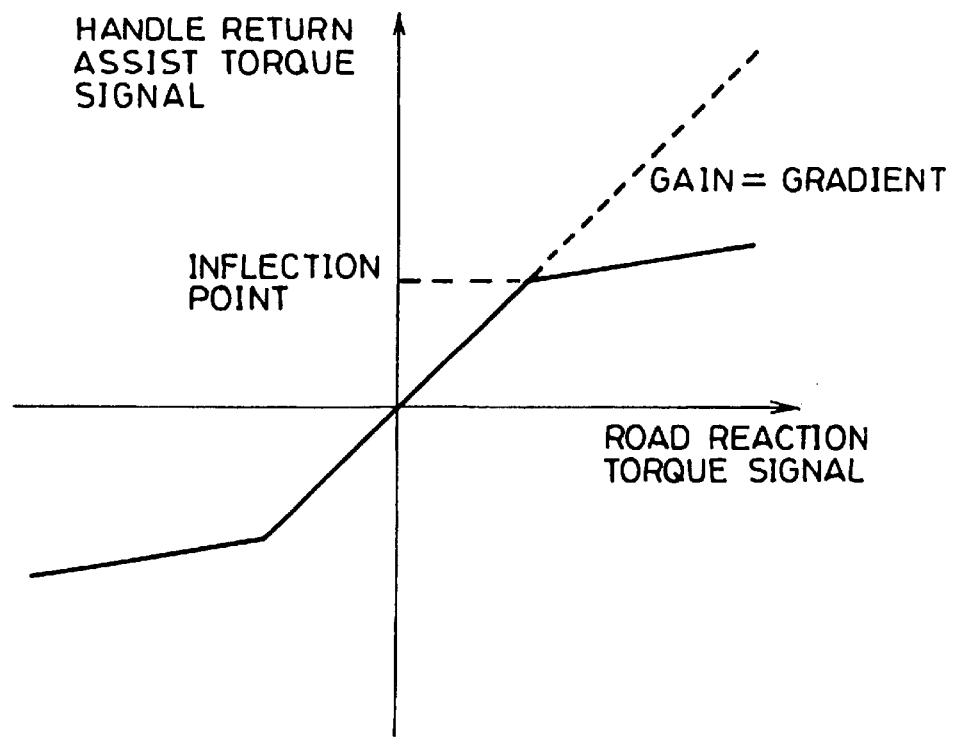
FIG. 35 is a diagram showing the characteristics of another return torque compensator.
Figure 36:
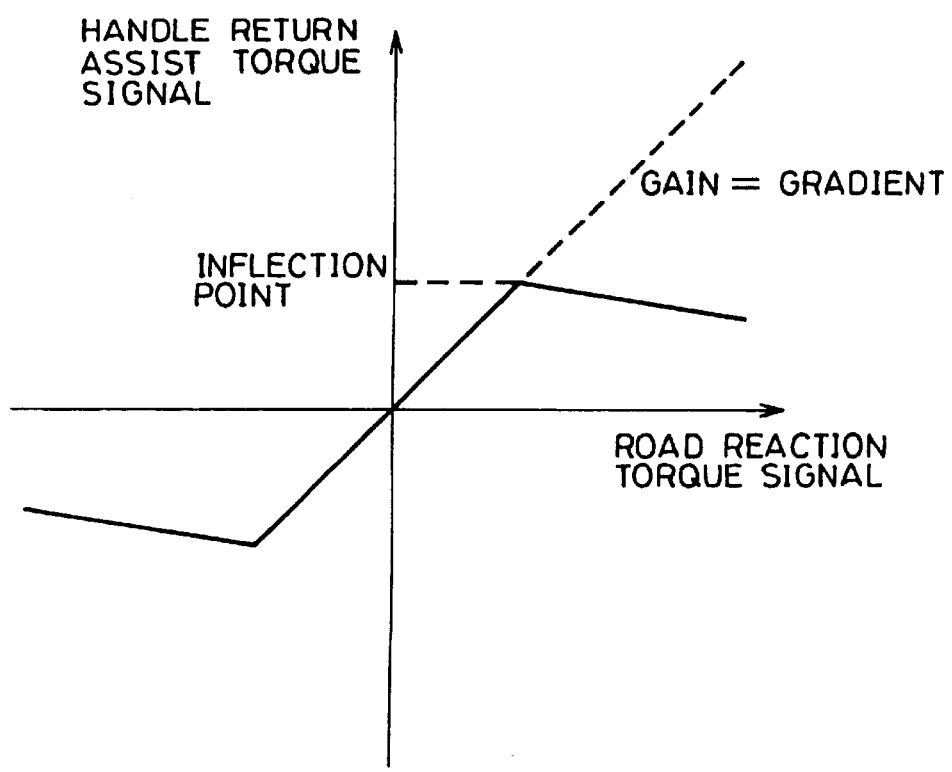
FIG. 36 is a diagram showing the characteristics of still another return torque compensator.

In the forgoing example, the maximum value of handle return assist torque signal is limited by the limiter. As shown in FIGS. 35 and 36, the gain may be fixed before the road reaction torque signal reaches an inflection point and the handle return assist torque signal may be increased or reduced after the road reaction torque signal exceeds the above inflection point.

Embodiment 14

Figure 37:
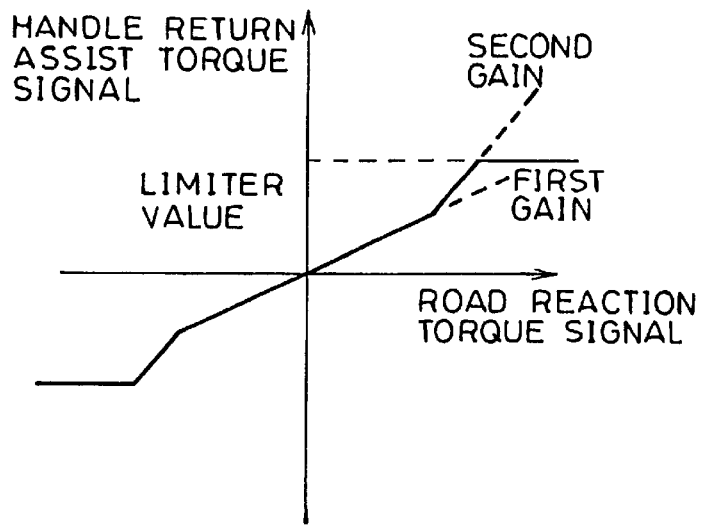
FIG. 37 is a diagram showing the characteristics of a further return torque compensator.

In Embodiment 13, only one gain is set. As shown in FIG. 37, the returnability of the steering wheel to its starting point can be further improved by setting multiple gains.

For example, when the driver turns the steering wheel excessively while driving at a high speed, driving stability is lost and the vehicle is spun, which may cause a serious accident. Therefore, it is important to prevent the steering wheel from being turned excessively while driving at a high speed. Steering torque is made large when the steering wheel is turned excessively to make it difficult to turn the steering wheel excessively, thereby increasing the effect of preventing the steering wheel from being turned excessively.

FIG. 37 shows a map for the computation of a handle return assist torque signal from a road reaction torque signal. A first gain at an area where the road reaction torque signal is small is set small in response to car speed to enable the steering wheel to return to its starting point. In contrast to this, a second gain at an area where the road reaction torque signal is large is set large so that the road reaction torque signal increases sharply as the steering wheel is turned to a greater extent, whereby steering torque becomes large.

Figure 38:
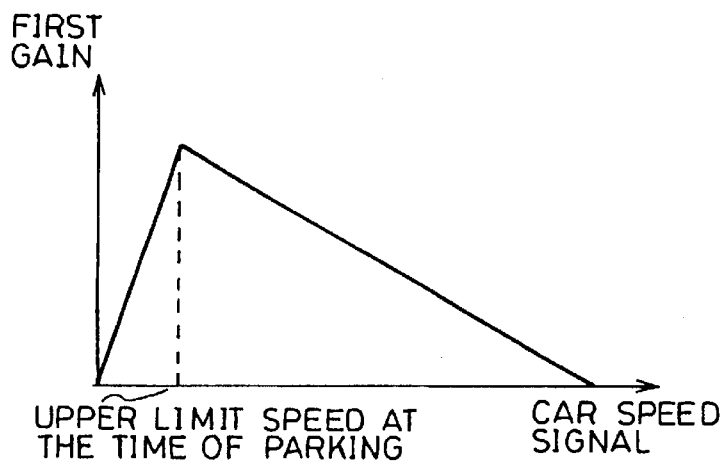
FIG. 38 is a diagram showing the characteristics of the first gain of the return torque compensator
Figure 39:
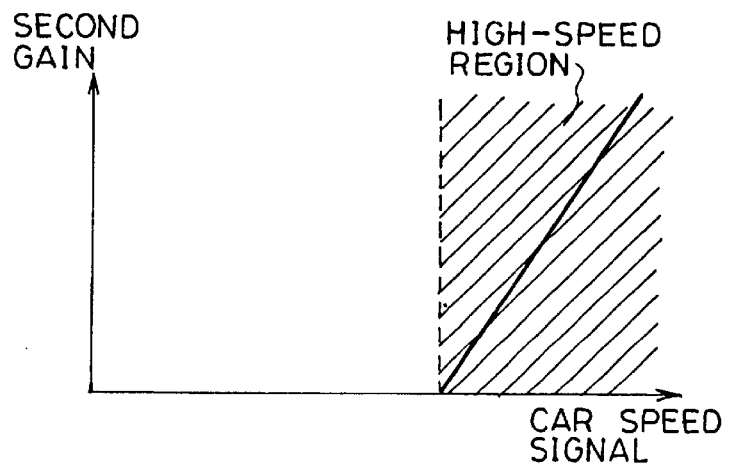
FIG. 39 is a diagram showing the characteristics of the second gain of the return torque compensator.
Figure 40:
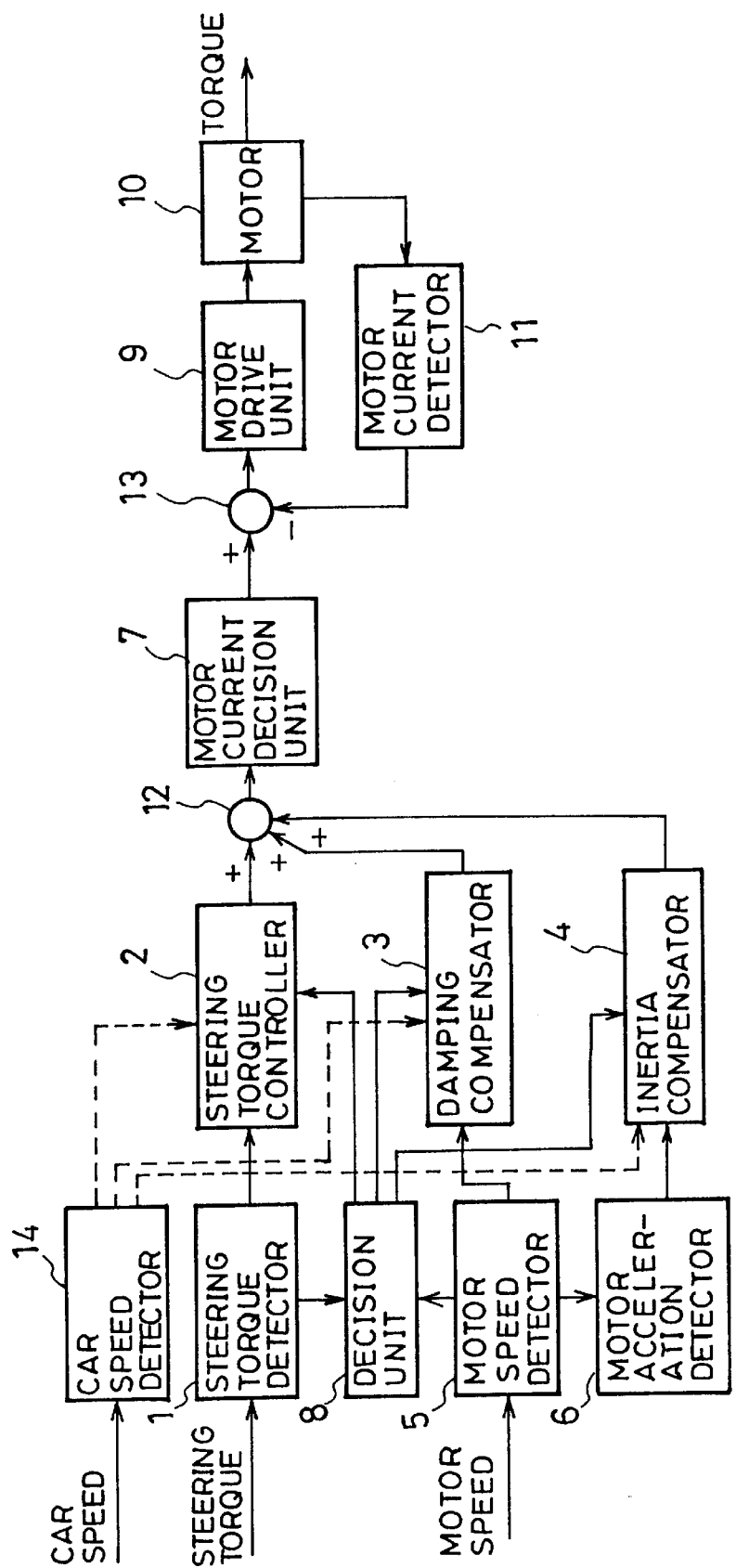
FIG. 40 is a block diagram showing an electric power steering controller of the prior art.

The first gain becomes the largest when the car speed reaches approximately the upper limit value of general parking speed as shown in FIG. 38 as in the Embodiment 9, and the second gain becomes "0" at an area other than a high-speed range and larger as the car speed increases as shown in FIG. 39.

Thus, in this Embodiment 14, the first gain is set small in accordance with car speed at an area where the road reaction torque signal is small and the second gain is set large at an area where the road reaction torque signal is large. Therefore, when normal steering is carried out while driving at a high speed, the excellent returnability of the steering wheel to its starting point is obtained and when the steering wheel is turned excessively, the road reaction torque signal increases sharply as the steering wheel is turned more excessively. Therefore, the steering torque becomes large, thereby making it possible to prevent the steering wheel from being turned excessively.

In this Embodiment 14, only the gain is changed. However, the limiter may be set larger as the car speed increases.

As has been described, according to the first aspect of the present invention, the electric power steering controller comprises road reaction torque detection means for detecting reaction received by the tires from the surface of a road and road reaction torque addition control means for controlling the torque of the motor for assisting the steering torque of the driver based on the road reaction torque detected by the above road reaction torque detection means. Therefore, even when the driver releases his/her hands from the steering wheel to return the steering wheel to its starting point after turning the steering wheel, road reaction torque which is substantially proportional to the angle of the steering wheel can be detected and the steering wheel can be returned to the center without fail.

According to the second aspect of the present invention, in addition to the constitution of the first aspect, the electric power steering controller further comprises steering torque detection means for detecting the steering torque of the driver and steering assist control means for controlling the torque of the motor based on the output of the steering torque detection means. Therefore, when the driver controls the steering wheel while holding it, a steering assist torque signal for assisting steering can be generated based on a steering torque signal and when the driver releases his/her hands from the steering wheel, the above road reaction torque addition control means can return the steering wheel to its starting point without fail. That is, the control algorithm of the prior art is used directly when the driver holds the steering wheel and control algorithm for returning the steering wheel to its starting point is added when the driver releases his/her hands from the steering wheel so that the motor can output torque in a direction for returning the steering wheel after the driver releases his/her hands from the steering wheel, thereby making it possible to return the steering wheel to the center without fail.

According to the third aspect of the present invention, the amount of control of the above road reaction torque addition control means is obtained by multiplying the output of the road reaction torque detection means by a single gain or multiple gains and the maximum value of the above control is limited by the limiter. Therefore, the steering wheel can be returned to its starting point without fail and steering torque can be prevented from becoming large carelessly.

According to the fourth aspect of the present invention, car speed detection means for detecting car speed is provided, and the values of the above gain and limiter are set according to the output of the car speed detection means. Therefore, the returnability of the steering wheel to its starting point can be improved regardless of car speed.

According to the fifth aspect of the present invention, the values of the above gain and limiter are set such that the output of the road reaction torque addition control means becomes large when the car speed is low excluding the case where the car speed is extremely low at the time of parking. Therefore, the returnability of the steering wheel to its starting point can be improved regardless of car speed without reducing operation ease at the time of parking.

According to the sixth aspect of the present invention, motor current detection means and motor rotation angle acceleration detection means are provided, and the road reaction torque detection means obtains a road reaction toque detection value by passing through a low-pass filter a value obtained by subtracting motor inertia torque in terms of the steering shaft computed from the output of the above motor rotation angle acceleration detection means from the sum of the output of the steering torque detection means and motor torque in terms of the steering shaft computed from the output of the above motor current detection means. Therefore, the road reaction torque detector and wiring therefor become unnecessary, thereby making it possible to reduce the size and cost of the electric power steering controller.

According to the seventh aspect of the present invention, motor current detection means is provided, and the road reaction torque detection means obtains a road reaction torque detection value by passing through a low-pass filter a value obtained by adding up the output of the steering torque detection means and motor torque in terms of the steering shaft computed from the output of the above motor current detection means. Therefore, the computation of a motor inertia torque term becomes unnecessary in an electric power steering controller in which motor inertia torque is smaller than a road reaction torque detection value, such as an electric power steering controller equipped with a small-sized motor or brushless motor, thereby making it possible to reduced the operation load of a microcomputer.

According to the eighth aspect of the present invention, motor rotation angle acceleration detection means is provided, and the road reaction toque detection means obtains a road reaction torque detection value by passing through a low-pass filter a value obtained by subtracting motor inertia torque in terms of the steering shaft computed from the output of the above motor rotation angle acceleration detection means from the output of the steering torque detection means. Therefore, the computation of a motor torque term in terms of the steering shaft becomes unnecessary in an electric power steering controller in which motor torque in terms of the steering shaft at a steering range where road reaction torque addition control must be carried out is smaller than the road reaction torque detection value, thereby making it possible to reduce the operation load of a microcomputer.

According to the ninth aspect of the present invention, motor torque detection means for detecting torque generated by the motor and motor rotation angle acceleration detection means for detecting the rotation angle acceleration of the motor are provided, and the road reaction torque detection means obtains a road reaction torque detection value by passing through a low-pass filter a value obtained by subtracting motor inertia torque in terms of the steering shaft computed from the output of the above motor rotation angle acceleration detection means from the sum of the output of the steering torque detection means and the output of the above motor torque detection means. Therefore, as torque generated by the motor can be detected in an electric power steering controller equipped with a sensor for detecting torque generated by the motor, road reaction torque can be detected with higher accuracy than the computation of torque generated by the motor from a motor current.

According to the tenth aspect of the present invention, motor rotation angle acceleration detection means for detecting the rotation angle acceleration of the motor is provided, and the road reaction torque detection means obtains a road reaction torque detection value by passing through a low-pass filter a value obtained by subtracting motor inertia torque in terms of the steering shaft computed from the output of the above motor rotation angle acceleration detection means from the sum of the output of the steering torque detection means and the target value of motor torque in terms of the steering shaft computed from the target value of current for driving the motor. Since a current ripple generated by PWM which is generally carried out when the motor is driven is not superimposed on a target current, road reaction torque can be detected accurately without being influenced by the current ripple.

According to the eleventh aspect of the present invention, motor current detection means for detecting a current running through the motor is provided, and the road reaction torque detection means obtains a road reaction torque detection value by passing through a low-pass filter a motor torque value in the terms of the steering shaft computed from the output of the above motor current detection means. As the output of the steering torque detection means is substantially proportional to the output of the motor current detection means, road reaction torque can be detected without using the output of the steering torque detection means, thereby making it possible to simplify arithmetic processing.

According to the twelfth aspect of the present invention, motor current detection means for detecting a current running through the motor and power voltage detection means for detecting power voltage applied to the motor are provided, and the rotation angle acceleration detection means of the road reaction torque detection means computes the rotation angle acceleration of the motor from the output of the above motor current detection means and the product of the output of the power voltage detection means and the duty ratio of a PWM signal for driving the motor. Therefore, a motor rotation angle sensor or a motor rotation angle speed sensor for detecting the rotation angle acceleration of the motor becomes unnecessary and the cost of the electric power steering controller can be reduced.

According to the thirteenth aspect of the present invention, the road reaction torque detection means obtains the output of the steering torque detection means through a low-pass filter. Therefore, in an electric power steering controller in which motor inertia torque is smaller than a road reaction torque detection value and motor torque in terms of the steering shaft at a steering range where road reaction torque addition control must be carried out is smaller than the road reaction torque detection value, the computation of a motor inertia torque term and a motor torque term in terms of the steering shaft becomes unnecessary, thereby making it possible to reduce the operation load of a microcomputer used in the electric power steering controller.

According to the fourteenth aspect of the present invention, the break frequency of the above low-pass filter is set to a frequency band at which the driver generally controls the steering wheel and the influence of the friction torque of the steering unit upon a detection error which affects the road reaction torque detection value is minimized. Therefore, the detection accuracy of road reaction torque can be improved.

According to the fifteenth aspect of the present invention, the break frequency of the above low-pass filter is set according to the output of the car speed detection means. Therefore, the detection accuracy of road reaction torque can be improved regardless of car speed and the returnability of the steering wheel to its starting point can also be improved.

According to the sixteenth aspect of the present invention, the output of the steering torque detection means is applied to the road reaction torque detection means through the low-pass filter. Therefore, a motor inertia torque term and a motor torque term in terms of the steering steel can be ignored in an electric power steering controller in which motor inertia torque is smaller than a road reaction torque detection value and motor torque in terms of the steering shaft at a steering range where road reaction torque addition control must be carried out is smaller than the road reaction torque detection value. Consequently, the computation of these terms becomes unnecessary, thereby making it possible to reduce the operation load of a microcomputer.

According to the seventeenth aspect of the present invention, the output of the steering torque detection means which is applied to the road reaction torque detection means of the sixth aspect has a dead zone at around "0" of the steering torque signal. Therefore, the returnability of the steering wheel to its starting point can be improved without being affected by torque required for holding the steering wheel at the time of straight-line driving due to the offset of the steering torque detection means at the time of detection and the cant of the surface of a road.

According to the eighteenth aspect of the present invention, the output of the road reaction torque detection means of the first aspect has a dead zone at around "0" of the road reaction torque. Therefore, the returnability of the steering wheel to its starting point can be improved without being affected by unrequired torque at the time of straight-line driving.

According to the nineteenth aspect of the present invention, the road reaction torque addition control means comprises distortion measuring means in a rack. Therefore, road reaction torque can be detected without fail, thereby making it possible to improve the returnability of the steering wheel to its starting point.

According to the twentieth aspect of the present invention, road reaction torque received by the tires from the surface of a road is detected and the motor for generating torque for assisting the steering force of the steering system is controlled based on this road reaction torque. Therefore, even when the driver releases his/her hands from the steering wheel to return the steering wheel to its starting point after turning the steering wheel, road reaction torque which is substantially proportional to the angle of the steering wheel can be detected and the steering wheel can be returned to the center without fail.

What is claimed is:

1. An electric power steering controller for a vehicle with a steering wheel coupled by a steering assembly to tires steered by the steering wheel, the controller controlling a motor generating a torque for assisting turning of the steering wheel by a driver of the vehicle and comprising:

a road reaction torque detector for sensing a road reaction torque received by the tires from a road contacting the tires, the road reaction torque tending to return the steering wheel to a starting point;

a returning torque compensator for computing a returning torque for returning the steering wheel to the starting point, based on the road reaction torque and a friction torque of the steering assembly coupling the tires to the steering wheel, the returning torque being provided when a steering torque approaches zero to compensate for the friction torque; and a motor current decision unit for determining a motor current to be fed to the motor, based on at least the returning torque computed by said returning torque compensator, to assist the driver in returning the steering wheel to the starting point.

2. The electric power steering controller according to claim 1, comprising:

a steering torque detector for detecting a steering torque applied by the driver to the steering wheel; and a steering torque control unit for computing an assisting torque for assisting the driver in turning the steering wheel, based on the steering torque.

3. The electric power steering controller according to claim 1, wherein said road reaction torque detector includes a distortion detector detecting mechanical distortion of a steering member and disposed on the steering member between gearing coupling the steering wheel to the tires.

4. The electric power steering controller according to claim 1, wherein said road reaction torque detector comprises a detector for sensing a parameter related to the road reaction torque and a road reaction torque computer for computing the road reaction torque based on the parameter sensed by said parameter sensing detector.

5. The electric power steering controller according to claim 4, wherein said road reaction torque computer receives the steering torque, motor acceleration, and the motor current.

6. The electric power steering controller according to claim 5, comprising a motor current detector for detecting the motor current, wherein the road reaction torque computer computes steering torque based on the motor current.

7. The electric power steering controller according to claim 5, comprising a motor current detector for detecting the motor current, a power supply voltage detector for detecting a voltage of a power supply connected to the motor, and a pulse width modulation (PWM) signal setting unit for setting an ON/OFF ratio of a PWM signal for driving the motor, wherein the motor acceleration is computed based on the motor current, the power supply voltage, and an output from the PWM signal setting unit.

8. The electric power steering controller according to claim 4, wherein said road reaction torque computer receives the steering torque and the motor current.

9. The electric power steering controller according to claim 4, wherein said road reaction torque computer receives the steering torque, motor acceleration, and motor torque.

10. The electric power steering controller according to claim 4, wherein said road reaction torque computer receives the steering torque, motor acceleration, and a command value of the motor current.

11. The electric power steering controller according to claim 4, wherein said road reaction torque computer outputs results of computations through a low pass filter for removing the friction torque from the results.

12. The electric power steering controller according to claim 11, comprising a vehicle speed detector for detecting speed of the vehicle, wherein said low pass filter has a time constant that is adjusted depending on the speed of the vehicle detected by said vehicle speed detector.

13. The electric power steering controller of claim 1, comprising a steering torque detector for detecting the steering torque applied by the driver to the steering wheel, wherein when an absolute value of steering torque detected by said steering torque detector is less than a threshold steering torque, said road reaction torque detector brings the road reaction torque sensed to zero.

14. The electric power steering controller according to claim 1, wherein the returning torque compensator computes the returning torque by multiplying the output of said road reaction torque detector by a gain, and limiting the returning torque to a maximum value.

15. The electric power steering controller according to claim 14, comprising a vehicle speed detector for detecting speed of the vehicle, wherein one of the gain and the maximum value is adjusted depending on the speed of the vehicle detected by said vehicle speed detector.

16. The electric power steering controller according to claim 15, wherein said returning torque compensator is adjusted so that when the speed of the vehicle exceeds a threshold speed, the returning torque becomes larger as the speed of the vehicle becomes smaller.

17. The electric power steering controller according to claim 14, wherein said returning torque compensator has a plurality of stages.

18. A method of controlling an electric power steering controller for a vehicle with a steering wheel coupled by a steering assembly to tires steered by the steering wheel, the controller controlling a motor generating a torque for assisting turning of the steering wheel by a driver of the vehicle, the method comprising:

sensing a road reaction torque received by the tires from a road in contact with the tires, the road reaction torque tending to return the steering wheel to a starting point;

computing a returning torque for returning the steering wheel to the starting point, based on the road reaction torque measured and a friction torque of the steering assembly coupling the tires to the steering wheel, the returning torque being provided as the steering torque approaches zero; and determining a motor current to be fed to the motor, based on at least the returning torque computed.

* * * * *